US009644744B2

(12) United States Patent
Nishimoto et al.

(10) Patent No.: US 9,644,744 B2
(45) Date of Patent: May 9, 2017

(54) SHAFT SEALING DEVICE AND ROTATING MACHINE PROVIDED THEREWITH

(71) Applicant: MITSUBISHI HEAVY INDUSTRIES, LTD., Tokyo (JP)

(72) Inventors: Shin Nishimoto, Tokyo (JP); Hidekazu Uehara, Tokyo (JP); Takashi Nakano, Tokyo (JP); Tanehiro Shinohara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/029,052

(22) PCT Filed: Oct. 18, 2013

(86) PCT No.: PCT/JP2013/078329
§ 371 (c)(1),
(2) Date: Apr. 13, 2016

(87) PCT Pub. No.: WO2015/056343
PCT Pub. Date: Apr. 23, 2015

(65) Prior Publication Data
US 2016/0258536 A1    Sep. 8, 2016

(51) Int. Cl.
*F16J 15/32* (2016.01)
*F16J 15/3292* (2016.01)

(52) U.S. Cl.
CPC ................. *F16J 15/3292* (2013.01)

(58) Field of Classification Search
CPC ............ F16J 15/3284; F16J 15/3292
See application file for complete search history.

(56) References Cited

U.S. PATENT DOCUMENTS

| 2,486,939 A | 11/1949 | Freund |
| 2006/0208427 A1* | 9/2006 | Wright ................ F16J 15/3288 277/413 |

(Continued)

FOREIGN PATENT DOCUMENTS

| JP | 3616016 | 2/2005 |
| JP | 2006-118585 | 5/2006 |

(Continued)

OTHER PUBLICATIONS

International Search Report issued Nov. 19, 2013 in corresponding International Application No. PCT/JP2013/078329, with English translation.

(Continued)

*Primary Examiner* — Gilbert Lee
(74) *Attorney, Agent, or Firm* — Wenderoth, Lind & Ponack, L.L.P.

(57) ABSTRACT

Disclosed is a shaft sealing device including: a housing in which an annular recessed portion is formed and which is fixed to a stator; a sealing body, a radially outer portion of which is accommodated by the annular recessed portion; and a high pressure-side sealing plate that is disposed along the sealing body in a high pressure region. An inflow groove is formed in any member of the housing, the high pressure-side sealing plate, and the sealing body such that a fluid flows through the sealing body from a low pressure region during a non-normal operation in which pressure in the high pressure region is higher than pressure in the high pressure region. A communication path is formed in the housing such that the inflow groove and a space in the high pressure region communicate with each other via the communication path.

8 Claims, 14 Drawing Sheets

(56) References Cited

U.S. PATENT DOCUMENTS

2013/0154195 A1    6/2013  Uehara et al.
2014/0241877 A1*   8/2014  Uehara ................ F01D 11/001
                                                          415/231

FOREIGN PATENT DOCUMENTS

| JP | 2008-275157 | 11/2008 |
| JP | 2011-169319 | 9/2011 |
| JP | 2012-137033 | 7/2012 |
| WO | WO2013062040 A1 * | 5/2013 |

OTHER PUBLICATIONS

Written Opinion of the International Searching Authority issued Nov. 19, 2013 in corresponding International Application No. PCT/JP2013/078329, with English translation.
Extended European Search Report issued Oct. 10, 2016 in corresponding European Application No. 13895802.0.

* cited by examiner

FIG. 5
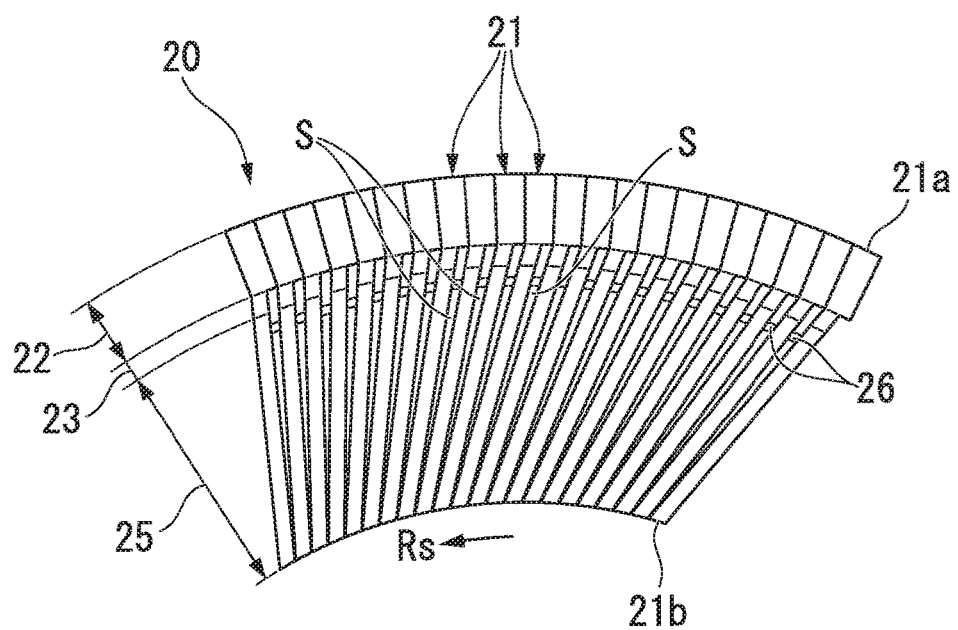
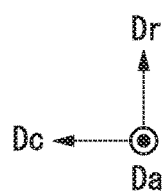

SHAFT SEALING DEVICE AND ROTATING MACHINE PROVIDED THEREWITH

TECHNICAL FIELD

The present invention relates to a shaft sealing device that suppresses the flow of a fluid in an axial direction of a rotating shaft, and to a rotating machine provided therewith.

BACKGROUND ART

A shaft sealing device is provided around a rotating shaft of a rotating machine such as a gas turbine or a steam turbine so as to reduce the amount of leakage of a working fluid flowing from a high pressure side to a low pressure side. PTL 1 discloses an example of the shaft sealing device.

The shaft sealing device includes a sealing body formed of a large number of thin plate-like sealing pieces. In the shaft sealing device, a large number of the thin plate-like sealing pieces are stacked in a circumferential direction of a rotating shaft in a state where a thickness direction of the thin plate-like sealing pieces is coincident with the circumferential direction. Each of the thin plate-like sealing pieces is disposed in an inclined manner such that a radially inner end of the thin plate-like sealing piece is further rotated in a rotation direction of the rotating shaft than a radially outer end thereof.

In the shaft sealing device, the radially inner end of each of the thin plate-like sealing pieces is a free end. The free end comes into contact with the rotating shaft when the rotation shaft is stopped. In contrast, when the rotating shaft rotates, a lifting force which lifts the free end from an outer circumferential surface of the rotating shaft occurs on a free end side of each of the thin plate-like sealing pieces due to dynamic pressure effects caused by the rotation of the rotating shaft. In the shaft sealing device, when a working fluid flows between the thin plate-like sealing pieces from a high pressure region positioned on one side in an axial direction in which the rotating shaft extends to a low pressure region, the working fluid flows away from the rotating shaft, that is, flows to the outside in a radial direction, while flowing to the low pressure region. For this reason, due to this flow, a pressure distribution is formed such that the thin plate-like sealing pieces are lifted, and a lifting force occurs on the free end side of the thin plate-like sealing pieces.

As such, when the rotating shaft rotates, the free end of each of the thin plate-like sealing pieces is lifted from the rotating shaft, and does not come into contact with the rotating shaft. For this reason, in the shaft sealing device, wear on the thin plate-like sealing pieces is reduced, and seal life is extended.

CITATION LIST

Patent Literature

[PTL 1] Japanese Patent Application No. 3616016

SUMMARY OF INVENTION

Technical Problem

In the shaft sealing devices of the related art, the working fluid is required to flow in a predetermined direction from the high pressure region to the low pressure region in the axial direction of the rotating shaft so as to cause the free end of each of the thin plate-like sealing pieces to lift from the rotating shaft. In contrast, in some rotating machines, the working fluid may flow in reverse in the axial direction of the rotating shaft. In the following description, the flow of the working fluid which lifts the free end of each of the thin plate-like sealing pieces is referred to as a normal operation flow, and a flow opposite to the normal operation flow is referred to as a non-normal operation flow.

In the related art, in a case where the shaft sealing device is installed in order for the working fluid to flow in a normal operation flow direction, and an inversion of pressure levels between the low pressure region and the high pressure region occurs, the flow direction of the working fluid becomes a non-normal operation flow direction. In this case, the working fluid flowing between the thin plate-like sealing pieces flows to a side close to the rotating shaft, that is, the inside in the radial direction. In such a state, in the shaft sealing device of the related art, a pressure distribution may be formed which presses the thin plate-like sealing pieces to a rotating shaft side, and the free end of each of the thin plate-like sealing pieces may not be lifted from the rotating shaft.

Accordingly, in the shaft sealing device of the related art, in a case where the working fluid flows reversely in the axial direction of the rotating shaft, the free end of each of the thin plate-like sealing pieces of the sealing body is not lifted from the rotating shaft, and the sealing body comes into contact with the rotating shaft. As a result, wear may occur, and seal life may be reduced, which is a problem. In a case where wear on the sealing body occurs, sealing performance in the normal operation flow direction may be reduced, which is another problem.

An object of the present invention is to provide a shaft sealing device in which wear on a sealing body caused by contact between the sealing body and a rotating shaft is prevented, and seal life is extended even if a working fluid flows in reverse in an axial direction of the rotating shaft, and to provide a rotating machine provided therewith.

Solution to Problem

According to a first aspect of the present invention, in order to solve these problems, there is provided a shaft sealing device that divides an annular space between a rotating shaft and a stator covering an outer circumferential side of the rotating shaft into a low pressure region and a high pressure region in an axial direction in which the rotating shaft extends, the device including: a housing in which an annular recessed portion is formed to extend in a circumferential direction with respect to the rotating shaft as a center, and which is fixed to the stator; a sealing body which is disposed at an outer circumference of the rotating shaft, and a portion of which is accommodated by the annular recessed portion of the housing and is positioned on the radially outside of the rotating shaft; and a high pressure-side sealing plate that is disposed along the sealing body in the high pressure region inside the annular recessed portion of the housing while a thickness direction of the high pressure-side sealing plate is aligned with the axial direction. An inflow groove is formed in a radially outer portion of any member of the sealing body, the housing, and the high pressure-side sealing plate such that a fluid is capable of flowing through a portion of the sealing body from the low pressure region. A communication path is formed in either member of the housing and the high pressure-side sealing plate such that the inflow groove and a space in the high pressure region communicate with each other via the communication path.

During a non-normal operation in which pressure in the low pressure region is higher than pressure in the high pressure region, the fluid passes through the sealing body from the low pressure region, and flows into the space in the high pressure region having a low pressure. In the shaft sealing device, the inflow groove is formed in the radially outer portion of any member of the sealing body, the housing, and the high pressure-side sealing plate. For this reason, during the non-normal operation, a portion of the fluid flows into the inflow groove during a process in which the fluid passes through the sealing body from the low pressure region. The fluid flowing into the inflow groove flows into the space in the high pressure region having a low pressure through the communication path.

Accordingly, in the shaft sealing device, during the non-normal operation, a portion of the fluid flows to the outside in the radial direction in the process in which the fluid passes through the sealing body from the low pressure region. In the shaft sealing device, during the non-normal operation, a lifting force occurs in a radially inner portion of the sealing body due to this flow. For this reason, a radially inner end of the sealing body is lifted from the rotating shaft.

The sealing body may include multiple thin plate-like sealing pieces having a thin plate shape. The multiple thin plate-like sealing pieces may be stacked on top of each other in the circumferential direction while the thickness direction of the multiple thin plate-like sealing pieces is aligned with the circumferential direction. Radially inner ends of the multiple thin plate-like sealing pieces may form free ends, and radially outer portions of the multiple thin plate-like sealing pieces may be connected to each other.

According to a second aspect of the present invention, in order to solve these problems, the shaft sealing device of the first aspect may further include a blocking member which is displaced due to a change in the pressure in the high pressure region relative to the pressure in the low pressure region such that the blocking member opens a non-normal operation flow path formed from the sealing body to the space in the high pressure region via the inflow groove and the communication path, during a non-normal operation in which pressure in the low pressure region is higher than pressure in the high pressure region, and the blocking member blocks a portion of the non-normal operation flow path during a normal operation in which the pressure in the high pressure region is higher than the pressure in the low pressure region.

During the normal operation, the fluid passes through the sealing body from the high pressure region, and flows into a space in the low pressure region. In a case where a portion of the non-normal operation flow path is not blocked during the normal operation, a portion of the fluid flows into the space in the low pressure region from the high pressure region through the non-normal operation flow path. At this time, the fluid flows through the non-normal operation flow path in the sealing body to the inside in the radial direction from the high pressure region while flowing to the low pressure region. This flow applies a settling force to the radially inner portions of the thin plate-like sealing pieces.

In the shaft sealing device, during the normal operation, a portion of the non-normal operation flow path is blocked by the blocking member such that the occurrence of a settling force applied to the radially inner portion of the sealing body is minimized.

According to a third aspect of the present invention, in order to solve these problems, in the shaft sealing device of the second aspect, the high pressure-side sealing plate may be disposed in the annular recessed portion such that the high pressure-side sealing plate can be moved relative to the housing and the sealing body in the axial direction. The blocking member may be the high pressure-side sealing plate that comes into contact with the sealing body and blocks a portion of the non-normal operation flow path during the normal operation, and does not come into contact with the sealing body and opens the non-normal operation flow path during the non-normal operation.

In the shaft sealing device, since the high pressure-side sealing plate serves as a blocking member, during the normal operation, it is possible to block a portion of the non-normal operation flow path without increasing the number of components.

According to a fourth aspect of the present invention, in order to solve these problems, in the shaft sealing device of any one of the first to third aspects, multiple communication paths may be formed in the housing which pass through the inside of the housing from the inflow groove, and which communicate with the space in the high pressure region.

According to a fifth aspect of the present invention, in order to solve these problems, in the shaft sealing device of the second aspect, multiple communication paths may be formed in the housing which pass through the inside of the housing from the inflow groove, and which communicate with the space in the high pressure region, and a blocking member accommodating portion may be formed in the housing such that the blocking member accommodating portion communicates with the communication paths, and accommodates the blocking member such that the blocking member accommodating portion can be moved between a blocking position at which the communication path is blocked during the normal operation and an open position at which the communication path is open during the non-normal operation.

According to a sixth aspect of the present invention, in order to solve these problems, there is provided a shaft sealing device that divides an annular space between a rotating shaft and a stator covering an outer circumferential side of the rotating shaft into a low pressure region and a high pressure region in an axial direction in which the rotating shaft extends, the device including: a housing in which an annular recessed portion is formed to extend in a circumferential direction with respect to the rotating shaft as a center, and which is fixed to the stator; a sealing body which is disposed at an outer circumference of the rotating shaft, and a portion of which is accommodated by the annular recessed portion of the housing and is positioned on the radially outside of the rotating shaft; and a high pressure-side sealing plate that is disposed along the sealing body in the high pressure region inside the annular recessed portion of the housing while a thickness direction of the high pressure-side sealing plate is aligned with the axial direction. A non-normal operation flow path is formed in members including the sealing body selected among the sealing body, the housing, and the high pressure-side sealing plate such that a flow which lifts the sealing body from the rotating shaft is formed in the non-normal operation flow path during a process in which a fluid flows from the low pressure region to the high pressure region during a non-normal operation in which pressure in the low pressure region is higher than pressure in the high pressure region.

In the shaft sealing device, during the non-normal operation, a flow which lifts the sealing body from the rotating shaft is formed during the process in which the fluid flows from the low pressure region to the high pressure region. For this reason, in the shaft sealing device, the radially inner end of the sealing body is lifted from the rotating shaft.

According to a seventh aspect of the present invention, in order to solve these problems, the shaft sealing device of the sixth aspect may further include a blocking member which is displaced due to a change in the pressure in the high pressure region relative to the pressure in the low pressure region such that the blocking member blocks a portion of the non-normal operation flow path during a normal operation in which the pressure in the high pressure region is higher than the pressure in the low pressure region, and opens the non-normal operation flow path during the non-normal operation.

In the shaft sealing device, during the normal operation, a portion of the non-normal operation flow path is blocked by the blocking member.

According to another aspect of the present invention, in order to solve these problems, there is provided a rotating machine including: the shaft sealing device of any one of the aspects; the rotating shaft; and the stator.

Advantageous Effects of Invention

According to an aspect of the present invention, during the non-normal operation in which the pressure in the low pressure region is higher than the pressure in the high pressure region, the radially inner end of the sealing body is lifted from the rotating shaft. As a result, according to the aspect of the present invention, it is possible to prevent wear on the sealing body, and to extend seal life.

BRIEF DESCRIPTION OF DRAWINGS

FIG. 5 is an axial view of a sealing body in the first embodiment of the present invention.

FIG. 6(A) is a view of the housing viewing from an annular recessed portion side to a high pressure region, and FIG. 6(B) is a sectional view taken along line B-B in FIG. 6(A).

DESCRIPTION OF EMBODIMENTS

Hereinafter, an embodiment of a shaft sealing device and a rotating machine provided therewith in the present invention will be described with reference to the accompanying drawings.

[Embodiment of Rotating Machine]

Figure 1:
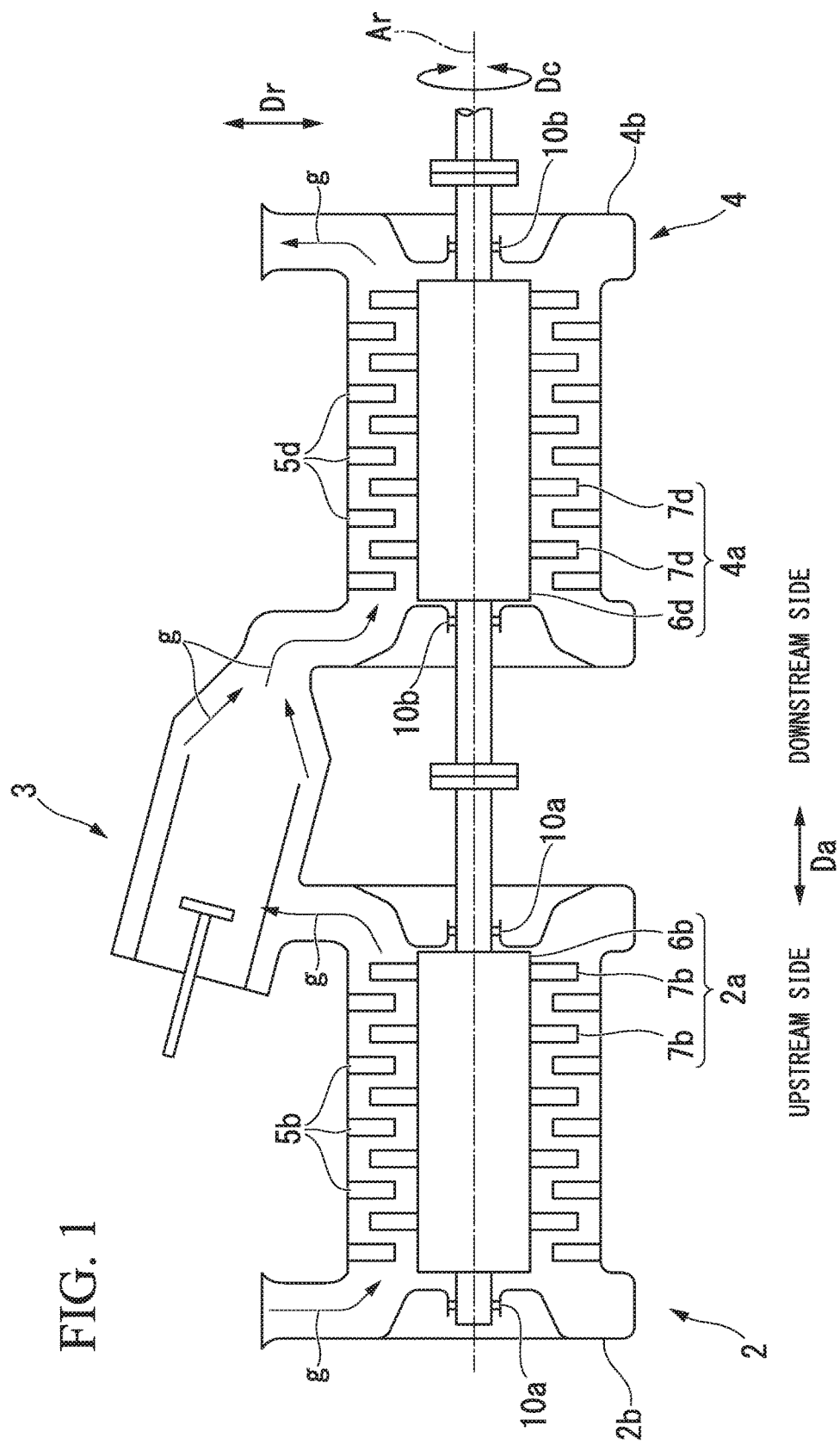
FIG. 1 is a schematic sectional view of a gas turbine in one embodiment of the present invention.

As illustrated in FIG. 1, a gas turbine facility includes a compressor 2 that suctions a large amount of air thereinto, and compresses the suctioned air; a combustion chamber 3 in which combustion of fuel takes place in the air compressed by the compressor 2, and combustion gas is generated; and a turbine 4 driven by the combustion gas from the combustion chamber 3.

The compressor 2 includes a compressor rotor 2a rotating around a rotating axis Ar, and a compressor casing 2b with which the compressor rotor 2a is rotatably covered. The turbine 4 includes a turbine rotor 4a rotating around the rotating axis Ar, and a turbine casing 4b with which the turbine rotor 4a is rotatably covered.

A direction, in which the rotating axis Ar extends, is simply referred to as an axial direction Da, a circumferential direction with respect to the rotating axis Ar is simply referred to as a circumferential direction Dc, and a radial direction with respect to the rotating axis Ar is simply referred to as a radial direction Dr. One side in the axial direction Da is referred to as an upstream side, and the other side is referred to as a downstream side. A side close to the rotating axis Ar in the radial direction Dr is referred to as an inside in the radial direction, and a side remote from the rotating axis Ar is referred to as an outside in radial direction.

The compressor rotor 2a and the turbine rotor 4a respectively include rotating shafts 6b and 6d which have the rotating axis Ar as the center and extend in the axial direction Da, and multiple rotor blade rows 7b and 7d which are respectively fixed to the rotating shafts 6b and 6d while being spaced therebetween in the axial direction Da. The rotor blade row 7b is configured to include multiple rotor blades which are fixed to an outer circumference of the rotating shaft 6b while being spaced therebetween in the circumferential direction Dc. The rotor blade row 7d is configured to include multiple rotor blades which are fixed to an outer circumference of the rotating shaft 6d while being spaced therebetween in the circumferential direction Dc. The rotating shaft 6b of the compressor 2 and the rotating shaft 6d of the turbine 4 are connected to each other such that the rotating shafts 6b and 6d rotate integrally, and form a rotating shaft 6 of the gas turbine.

Multiple stator blade rows 5b and 5d are respectively fixed inside the compressor casing 2b and the turbine casing 4b while being spaced therebetween in the axial direction Da. The stator blade row 5b is configured to include multiple stator blades which are fixed to an inner surface of the casing 2b while being spaced therebetween in the circumferential direction Dc. The stator blade row 5d is configured to include multiple stator blades which are fixed to an inner surface of the casing 4b while being spaced therebetween in the circumferential direction Dc.

As described above, the compressor 2 and the turbine 4 are rotating machines which respectively include the rotating shafts 6b and 6d; the casings 2b and 4b with which the outer circumferential sides of the rotating shafts 6b and 6d are covered; and the stator blade rows 5b and the stator blade rows 5d. A stator is formed of the casing 2b and the stator blade rows 5b of the compressor 2, and the casing 4b and the stator blade rows 5d of the turbine 4.

The compressor 2 further includes a shaft sealing device 10a that suppresses the flow of a working fluid (air) g in the axial direction Da. The shaft sealing device 10a is provided in an end portion of the inner surface of the compressor casing 2b in the axial direction Da such that the shaft sealing device 10a faces the rotating shaft 6b in the radial direction Dr.

When the rotating shaft 6b rotates, the internal pressure of the compressor casing 2b becomes higher than the external pressure. For this reason, in the shaft sealing device 10a, the inside of the compressor casing 2b in the axial direction Da becomes a high pressure region, and the outside of the compressor casing 2b in the axial direction Da becomes a low pressure region. The shaft sealing device 10a suppresses the flow of the working fluid g along the rotating shaft 6b from the inside (high pressure region) of the compressor casing 2b to the outside (low pressure region) of the compressor casing 2b.

The turbine 4 also includes a shaft sealing device 10b that suppresses the flow of the working fluid (combustion gas) g in the axial direction Da. The shaft sealing device 10b is provided in an end portion of the inner surface of the turbine casing 4b in the axial direction Da such that the shaft sealing device 10b faces the rotating shaft 6d in the radial direction Dr.

When the rotating shaft 6d rotates, the internal pressure of the turbine casing 4b becomes higher than the external pressure. For this reason, in the shaft sealing device 10b, the inside of the turbine casing 4b in the axial direction Da becomes a high pressure region, and the outside of the turbine casing 4b in the axial direction Da becomes a low pressure region. The shaft sealing device 10b suppresses the flow of the working fluid g along the rotating shaft 6d from the inside (high pressure region) of the turbine casing 4b to the outside (low pressure region) of the turbine casing 4b.

In the rotating machine in which shaft sealing devices such as the shaft sealing device 10a of the compressor 2 and the shaft sealing device 10b of the turbine 4 are installed, depending on installation locations and the operation state of the gas turbine, reversely, pressure in the low pressure region may become higher than pressure in the high pressure region, and the working fluid may flow in reverse in the axial direction of the rotating shafts 6b and 6d. Hereinafter, embodiments of the shaft sealing device will be described.

[First Embodiment of Shaft Sealing Device]

Figure 2:
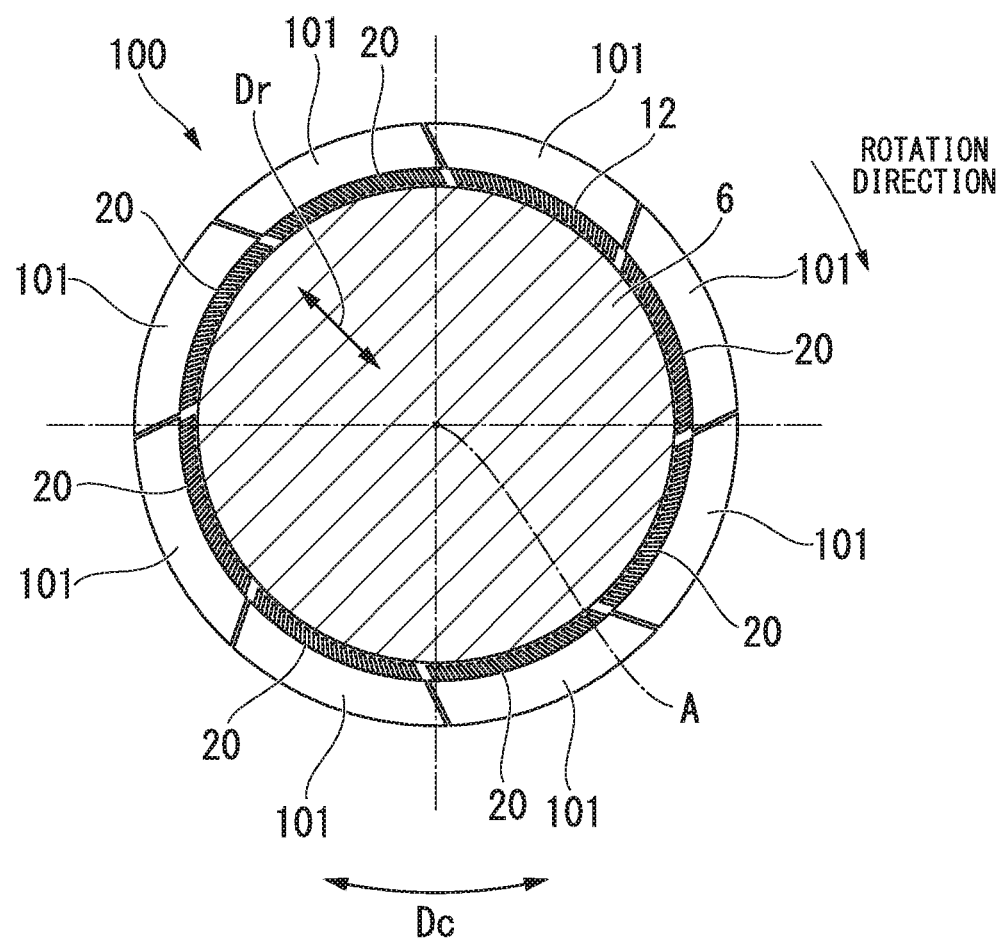
FIG. 2 is a sectional view of a region containing a rotating shaft of the gas turbine in the embodiment of the present invention.

As illustrated in FIG. 2, a shaft sealing device 100 in an embodiment is configured to include multiple arc-shaped seal segments 101 extending along an outer circumference of the rotating shaft 6 of the gas turbine (hereinafter, simply referred to as the rotating shaft 6) in the circumferential direction Dc.

Figure 3:
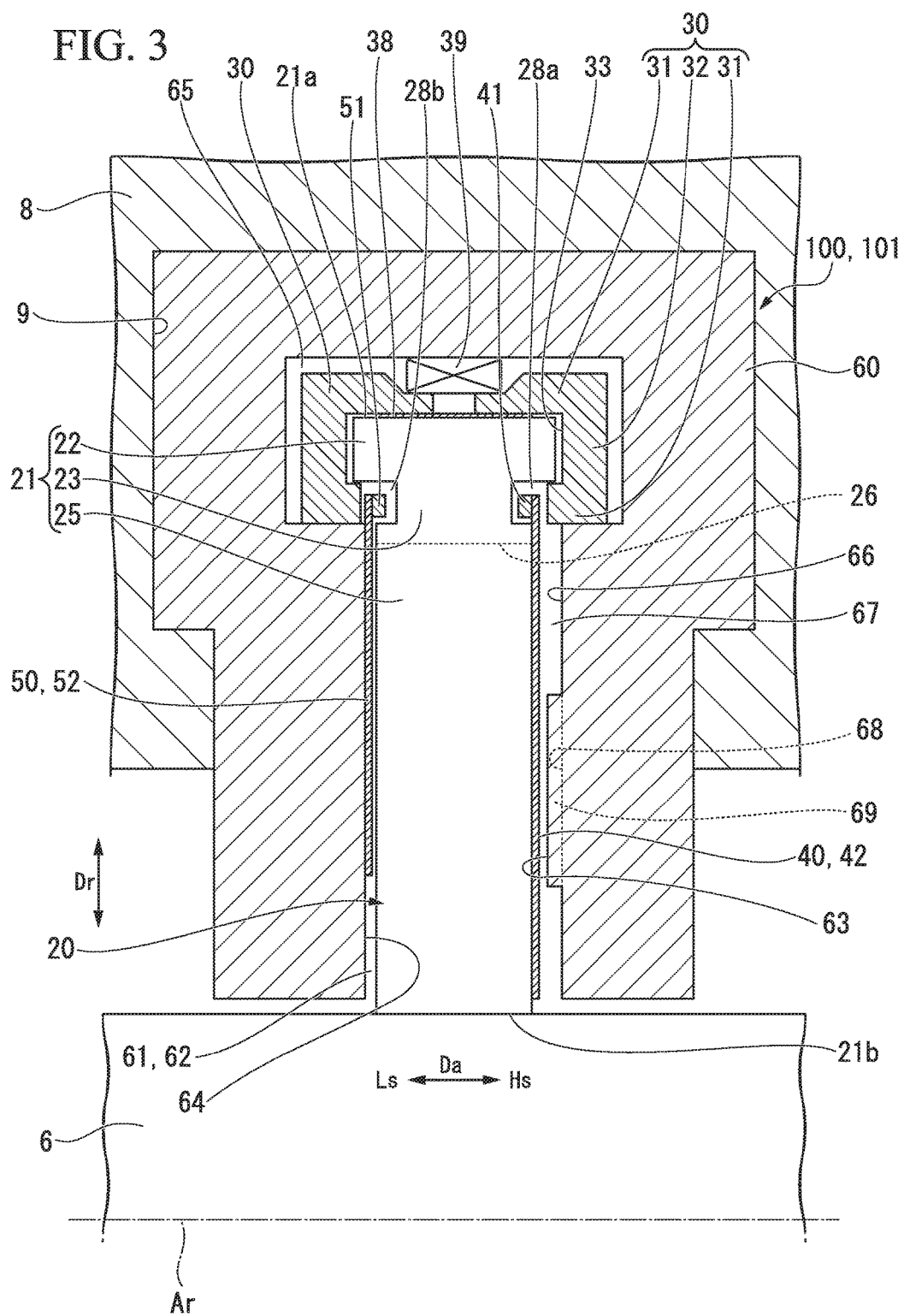
FIG. 3 is a sectional view of a shaft sealing device in a first embodiment of the present invention.

As illustrated in FIG. 3, a mounting portion 9 is formed in a stator 8 of the gas turbine such that the mounting portion 9 is recessed from the inside to the outside in the radial direction, and has annular shape with respect to the rotating axis Ar as a center. The seal segment 101 is mounted on the mounting portion 9 of the stator 8.

Figure 4:
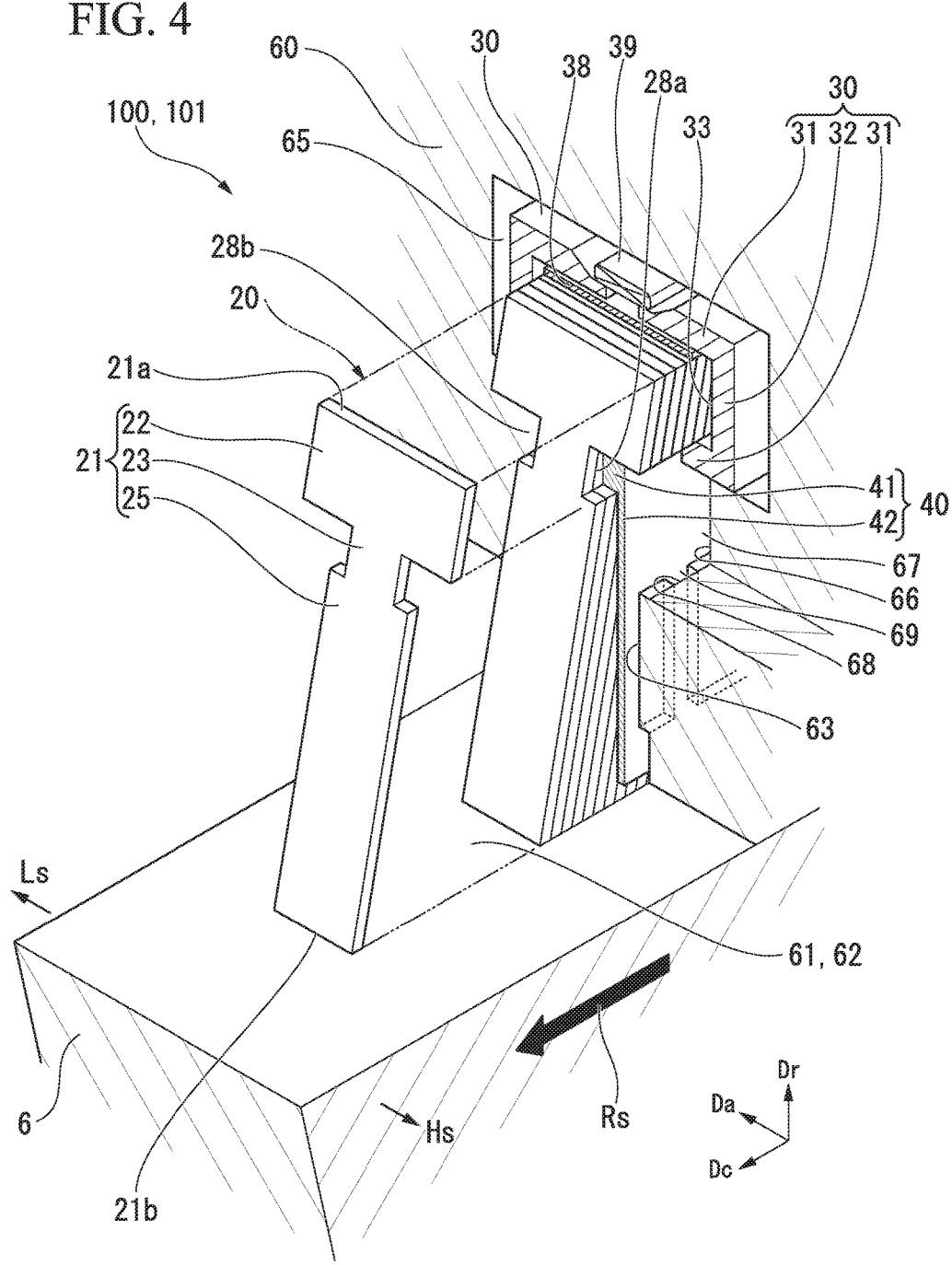
FIG. 4 is a perspective view illustrating a cutout main portion of the shaft sealing device in the first embodiment of the present invention.

As illustrated in FIGS. 3 and 4, each of the seal segments 101 includes a sealing body 20 which is a bundle of a large number of thin plate-like sealing pieces 21; a holding ring 30 that has a groove-shaped section and holds the sealing body 20; a seam 38 embedded in a gap between the holding ring 30 and the sealing body 20; a high pressure-side sealing plate 40 disposed on one side of the sealing body 20 in the axial direction Da of the rotating shaft 6; a low pressure-side sealing plate 50 disposed on the other side of the sealing body 20 in the axial direction Da of the rotating shaft 6; a back spacer 39 disposed on the radially outside of the holding ring 30; and a housing 60 with which the aforementioned components are covered. In the following description, one side of the sealing body 20 in the axial direction Da of the rotating shaft 6 is referred to as a high pressure region Hs, and the other side of the sealing body 20 in the axial direction Da of the rotating shaft 6 is referred to as a low pressure region Ls.

The thin plate-like sealing piece 21 is a member made of a thin plate. The thin plate-like sealing piece 21 is formed into a T shape when seen in the circumferential direction Dc, and the width direction thereof is aligned with the axial direction Da of the rotating shaft 6, in other words, the thickness direction thereof is aligned with the circumferential direction Dc of the rotating shaft 6.

The thin plate-like sealing piece 21 includes a head portion 22; a trunk portion 25 formed to have a width dimension and a thickness dimension less than those of the head portion 22; and a neck portion 23 that is positioned between the head portion 22 and the trunk portion 25, and is formed to have a width dimension less than those of the head portion 22 and the trunk portion 25. The head portion 22, the neck portion 23, and the trunk portion 25 are sequentially formed in the thin plate-like sealing piece 21 from the outside to the inside in the radial direction. An edge of the neck portion 23 on the high pressure region Hs is positioned closer to the low pressure region Ls than an edge of the head portion 22 in the high pressure region Hs, and an edge of the trunk portion 25 in the high pressure region Hs. As a result, a recess 28a is formed in a portion of the high pressure region Hs between the head portion 22 and the trunk portion 25 such that the recess 28a has the head portion 23 as a bottom, and is recessed to the low pressure region Ls. An edge of the neck portion 23 in the low pressure region Ls is positioned closer to the high pressure region Hs than an edge of the head portion 22 in the low pressure region Ls, and an edge of the trunk portion 25 in the low pressure region Ls. As a result, a recess 28b is formed in a portion of the low pressure region Ls between the head portion 22 and the trunk portion 25 such that the recess 28b has the head portion 23 as a bottom, and is recessed to the high pressure region Hs.

The thin plate-like sealing pieces 21 are stacked on top of each other in the circumferential direction Dc while the thickness direction of the thin plate-like sealing pieces 21 is aligned with the circumferential direction Dc. Radially outer ends 21a of the head portions 22 of the thin plate-like sealing pieces 21 are connected to each other. In addition, radially outer positions 26 of the trunk portions 25 of the thin plate-like sealing pieces 21 are connected to each other. That is, a radially outer portion of the thin plate-like sealing pieces 21 are connected to each other.

The trunk body 25 of each of the thin plate-like sealing pieces 21 can be elastically deformed, and a radially inner end 21b of the trunk portion 25 is a free end. Each of the thin plate-like sealing pieces 21 is disposed in an inclined manner such that the radially inner end 21b is further rotated in a rotation direction Rs of the rotating shaft 6 than the radially outer end 21a. When the rotating shaft 6 is stopped, the radially inner end 21b of the thin plate-like sealing piece 21 is in contact with an outer circumferential surface of the rotating shaft 6.

As described above, in the thin plate-like sealing piece 21, the head portion 22 has a thickness dimension (circumferential dimension) greater than those of the neck portion 23 and the trunk portion 25. For this reason, as illustrated in FIG. 5, a very small gap s is formed between the trunk portions 25 of two thin plate-like sealing pieces 21 adjacent to each other in the circumferential direction Dc.

The holding ring 30 is a member that has a grooved-shaped section, and extends in the circumferential direction Dc. The holding ring 30 includes a pair of side plates 31 facing each other in the radial direction Dr, and a bottom plate 32 through which ends of the pair of side plates 31 in the axial direction Da are connected to each other. Any one of the pair of side plates 31 and the bottom plate 32 extends in the circumferential direction Dc. A groove portion 33 is formed between the pair of side plates 31 of the holding ring 30, and has the bottom plate 32 as a groove bottom. The dimension between the pair of side plates 31, that is, the groove width is slightly greater than the width dimension of the head portion 22 of the thin plate-like sealing piece 21 in the radial direction Dr.

The holding rings 30 are each disposed in the high pressure region Hs and the low pressure region Ls of the head portion 22 of each of the thin plate-like sealing pieces 21. A portion of the head portion 22 of each of the thin plate-like sealing pieces 21 in the high pressure region Hs is inserted into the groove portion 33 of the holding ring 30 in the high pressure region Hs. A portion of the head portion 22 of each of the thin plate-like sealing pieces 21 in the low pressure region Ls is inserted into the groove portion 33 of the holding ring 30 in the low pressure region Ls. The seam 38 is fitted into the gap between the side plate 31 of the holding ring 30 on the outside in the radial direction and the head portions 22 of the thin plate-like sealing pieces 21. The head portions 22 of the thin plate-like sealing pieces 21 are held by the holding rings 30. As a result, the head portions 22 of the thin plate-like sealing pieces 21 cannot be moved with respect to each of the holding rings 30.

Each of the high pressure-side sealing plate 40 and a low pressure-side sealing plate 50 has the shape of an arc-shaped belt when seen in the axial direction Da while the thickness direction thereof is aligned with the axial direction Da.

As described above, the high pressure-side sealing plate 40 is disposed in the high pressure region Hs of the sealing body 20. The high pressure-side sealing plate 40 includes a base portion 41 on the outside in the radial direction, and a thin plate-like side sealing portion 42 extending from the base portion 41 to the inside in radial direction. The base portion 41 has a thickness dimension (dimension in the axial direction Da) greater than the thickness dimension (dimension in the axial direction Da) of the thin plate-like side sealing portion 42. The base portion 41 protrudes to the low pressure region Ls from the thin plate-like side sealing portion 42. The base portion 41 is inserted into the recess 28a between the head portion 22 and the trunk portion 25 of the thin plate-like sealing piece 21 in the high pressure region Hs.

As described above, the low pressure-side sealing plate 50 is disposed in the low pressure region Ls of the sealing body 20. Similar to the high pressure-side sealing plate 40, the low pressure-side sealing plate 50 includes a base portion 51 on the outside in the radial direction, and a thin plate-like side sealing portion 52 extending from the base portion 51 to the inside in radial direction. The base portion 51 has a thickness dimension (dimension in the axial direction Da) greater than the thickness dimension (dimension in the axial direction Da) of the thin plate-like side sealing portion 52. The base portion 51 protrudes to the high pressure region Hs from the thin plate-like side sealing portion 52. The base portion 51 is inserted into the recess 28b between the head portion 22 and the trunk portion 25 of the thin plate-like sealing piece 21 in the low pressure region Ls.

As illustrated in FIG. 3, the length dimension of the thin plate-like side sealing portion 52 of the low pressure-side sealing plate 50 in the radial direction Dr is less than the length dimension of the thin plate-like side sealing portion 42 of the high pressure-side sealing plate 40 in the radial direction Dr. For this reason, the distance from a radially inner edge of the thin plate-like side sealing portion 52 of the low pressure-side sealing plate 50 to the rotating shaft 6 is greater than the distance from a radially inner edge of the thin plate-like side sealing portion 42 of the high pressure-side sealing plate 40 to the rotating shaft 6. In other words, a gap between the rotating shaft 6 and the radially inner edge of the low pressure-side sealing plate 50 is greater than a gap between the rotating shaft 6 and the radially inner edge of the high pressure-side sealing plate 40.

Any one of the thin plate-like sealing pieces 21, the high pressure-side sealing plate 40, and the low pressure-side sealing plate 50 can be elastically deformed, and is made of INCONEL (trademark) alloys which are Ni-based alloys having good heat resistance, or STELLITE (trademark) alloys which are Co-based alloys.

The housing 60 can be mounted on the annular mounting portion 9, and has an arc-shaped exterior in the circumferential direction Dc. An annular recessed portion 61 is formed in the housing 60 such that the annular recessed portion 61 is recessed from the inside to the outside in the radial direction, and extends in the circumferential direction Dc. The annular recessed portion 61 includes an inner annular recessed portion 62 formed on the radially inside of the annular recessed portion 61, and an outer annular recessed portion 65 that forms the radially outside of the annular recessed portion 61, and is connected to the inner annular recessed portion 62.

The inner annular recessed portion 62 has a width dimension in the axial direction Da that is slightly greater than a dimension obtained by summing up the width dimension of the trunk portion 25 of the thin plate-like sealing piece 21 in the axial direction Da; the thickness dimension (dimension in the axial direction Da) of the high pressure-side sealing plate 40; and the thickness dimension (dimension in the axial direction Da) of the low pressure-side sealing plate 50.

The outer annular recessed portion 65 has a width dimension in the axial direction Da that is slightly greater than the sum of the width dimensions of the head portion 22 and the holding rings 30 in the axial direction Da in a state where the head portion 22 of each of the thin plate-like sealing pieces 21 is held by the holding rings 30. For this reason, the outer annular recessed portion 65 has a width dimension in the axial direction Da greater than the width dimension of the inner annular recessed portion 62 in the axial direction Da.

The thin plate-like sealing pieces 21 held by the holding rings 30 are disposed in the annular recessed portion 61 of the housing 60 along with the holding rings 30. The majority of the trunk portion 25 of each of the thin plate-like sealing pieces 21 is disposed in the inner annular recessed portion 62 of the housing 60. The radially inner end 21b of each of the thin plate-like sealing pieces 21 protrudes to the inside from the inner annular recessed portion 62 of the housing 60 in the radial direction, that is, protrudes the rotating shaft 6.

The back spacer 39 is disposed between the holding rings 30 and a surface that faces the inside in the radial direction and the outer circumferential surface of the rotating shaft 6 among surfaces defining the outer annular recessed portion 65 of the housing 60. The positions of the holding rings 30 and the head portions 22 of the thin plate-like sealing pieces 21 held by the holding rings 30 relative to the housing 60 in the radial direction Dr are fixed by the back spacer 39.

Figure 6:
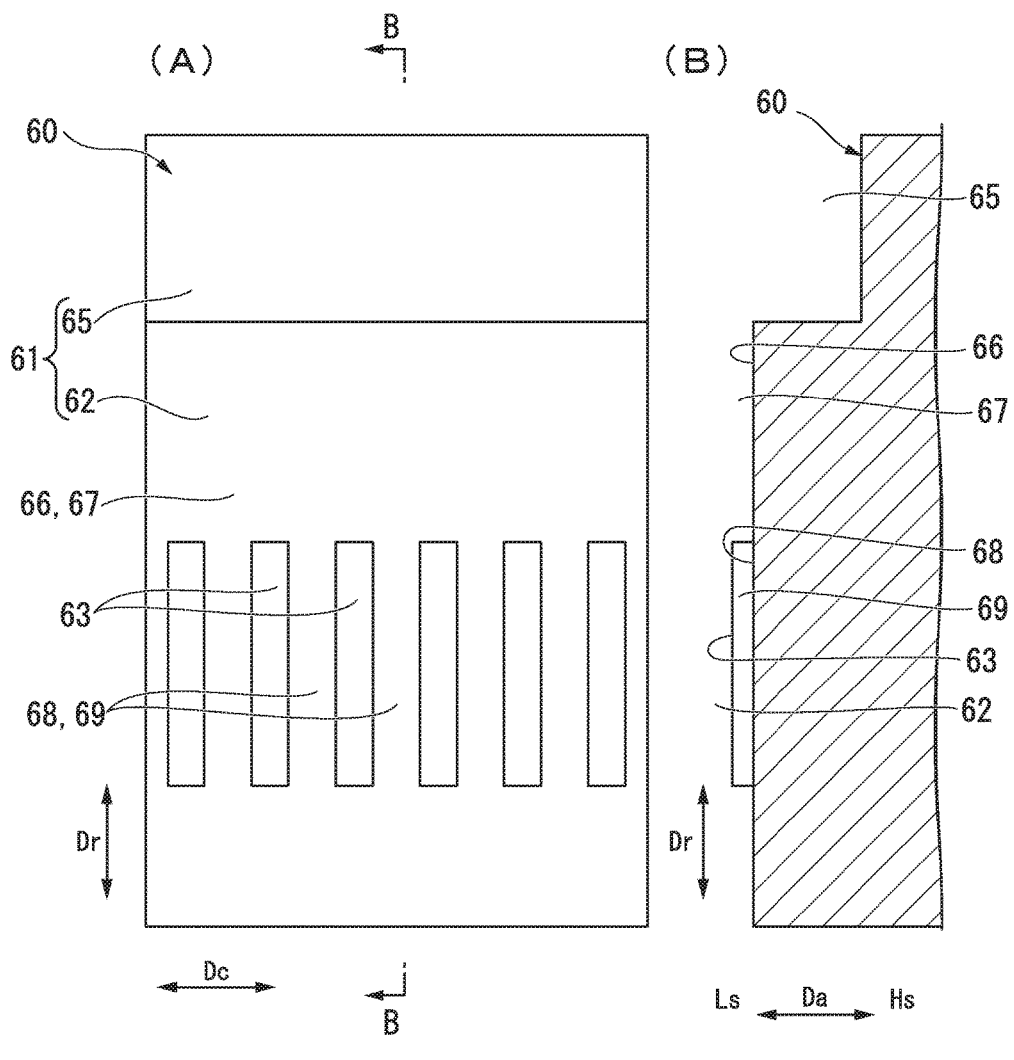
FIG. 6 is a view illustrating a housing of the shaft sealing device in the first embodiment of the present invention.

As illustrated in FIGS. 3, 4, and 6, an inflow groove 66 is formed in a high pressure-side inner surface 63, which extends in the circumferential direction Dc, in the high pressure region Hs among surfaces defining the inner annular recessed portion 62 of the housing 60. The inflow groove 66 is formed on the radially outside of the high pressure-side inner surface 63. More specifically, the position of an radially outer edge of the inflow groove 66 coincides with the position of a radially outer edge of the high pressure-side inner surface 63 (radially outer edge of the inner annular recessed portion 62). The position of a radially inner edge of the inflow groove 66 coincides with the position of a radially outer edge of a communication groove 68 (to be described later). An inflow space 67 is formed inside of the inflow groove 66 between the housing 60 and the high pressure-side sealing plate 40

Multiple communication grooves 68 are formed of recesses of a portion of the high pressure-side inner surface 63 of the housing 60, and extend to the inside from the inflow groove 66 in the radial direction. The multiple communication grooves 68 are formed in the high pressure-side inner surface 63 while being spaced therebetween in the circumferential direction Dc. Communication paths 69 are formed inside of the multiple communication grooves 68 between the housing 60 and the high pressure-side sealing plate 40.

Hereinafter, the operation of the shaft sealing device 100 in the embodiment will be described.

First, a normal operation, in which when the rotating shaft 6 rotates, the pressure of the working fluid in the high pressure region Hs becomes higher than the pressure of the working fluid in the low pressure region Ls, will be described with reference to FIG. 7. During the normal operation, pressure in the high pressure region Hs becomes a high pressure H, and pressure in the low pressure region Ls becomes low pressure L.

During the normal operation, a lifting force which lifts the radially inner ends 21b from the outer circumferential surface of the rotating shaft 6 is applied to the radially inner ends 21b of the thin plate-like sealing pieces 21 due to dynamic pressure effects caused by the rotation of the rotating shaft 6.

Since the pressure in the high pressure region Hs is a high pressure H, the sealing body 20, which is a bundle of the thin plate-like sealing pieces 21, and the holding rings 30 holding the head portions 22 of the thin plate-like sealing pieces 21 are integrally shifted to the annular recessed portion 61 of the housing 60 in the low pressure region Ls.

The low pressure-side sealing plate 50 is in contact with a low pressure-side inner surface 64 in the low pressure region Ls among the surfaces defining the inner annular recessed portion 62 of the housing 60. In contrast, the low pressure-side sealing plate 50 is separated from an edge of the sealing body 20 in the low pressure region Ls. The high pressure-side sealing plate 40 is in contact with an edge of the sealing body 20 in the high pressure region Hs, more specifically, edges of the trunk portions 25 of the thin plate-like sealing pieces 21 in the high pressure region Hs. For this reason, the working fluid in the high pressure region Hs flows into gaps between the thin plate-like sealing pieces 21 through a radially inner portion (not in contact with the high pressure-side sealing plate 40) of the edges of the thin plate-like sealing pieces 21 in the high pressure region Hs. The working fluid flowing into the gaps between the thin plate-like sealing pieces 21 flows from the gaps to the low pressure region Ls.

Since the low pressure-side sealing plate 50 is separated from the edge of the sealing body 20 in the low pressure region Ls, a space is formed between edges of the trunk portions 25 of the thin plate-like sealing pieces 21 in the low pressure region Ls and the low pressure-side sealing plate 50. Pressure in this space is substantially the same as the pressure in the low pressure region Ls. That is, pressure at the entire radial edges of the trunk portions 25 of the thin plate-like sealing pieces 21 of the sealing body 20 in the low pressure region Ls is substantially the same as pressure in the low pressure region Ls. In contrast, pressure in the portion (through which the working fluid in the high pressure region Hs flows) of the edges of the trunk portions 25 of the thin plate-like sealing pieces 21 in the high pressure region Hs, that is, pressure in the radially inner portion, with which the high pressure-side sealing plate 40 is not in contact becomes the highest pressure.

Accordingly, between the thin plate-like sealing pieces 21, the pressure in the radially inner portion of the edges of the trunk portions 25 of the sealing plate in the high pressure region Hs is the highest pressure, is gradually decreased toward the low pressure region Ls in the axial direction Da, and is gradually decreased toward the outside in the radial direction. The dotted lines depicted inside of the trunk portion 25 of the thin plate-like sealing piece 21 in FIG. 7 represent constant pressure lines Li.

Since the aforementioned pressure distribution is formed between the thin plate-like sealing pieces 21, the working fluid, which flows into the gaps between the thin plate-like sealing pieces 21 through the radially inner portion of the edges of the trunk portions 25 of the thin plate-like sealing pieces 21 in the high pressure region Hs, flows to the outside in the radial direction while flowing to the low pressure region Ls in the axial direction Da. Since, as illustrated by the arrows in FIG. 7, the flow of the working fluid to the outside in the radial direction is formed between the thin plate-like sealing pieces 21, a lifting force Fu occurs in a radially inner portion of each of the thin plate-like sealing pieces 21.

As described above, during the normal operation, the lifting force occurs due to dynamic pressure effects caused by the rotation of the rotating shaft 6, and the lifting force Fu occurs due to the flow (normal operation flow) of the fluid between the thin plate-like sealing pieces 21. For this reason, the free end, which is the radially inner end 21b of each of the thin plate-like sealing pieces 21, is lifted from the rotating shaft 6.

Hereinafter, a non-normal operation, in which pressure in the low pressure region Ls becomes higher than pressure in the high pressure region Hs, will be described. During the non-normal operation, the pressure in the high pressure region Hs becomes a low pressure L, and the pressure in the low pressure region Ls becomes a high pressure H.

Figure 10:
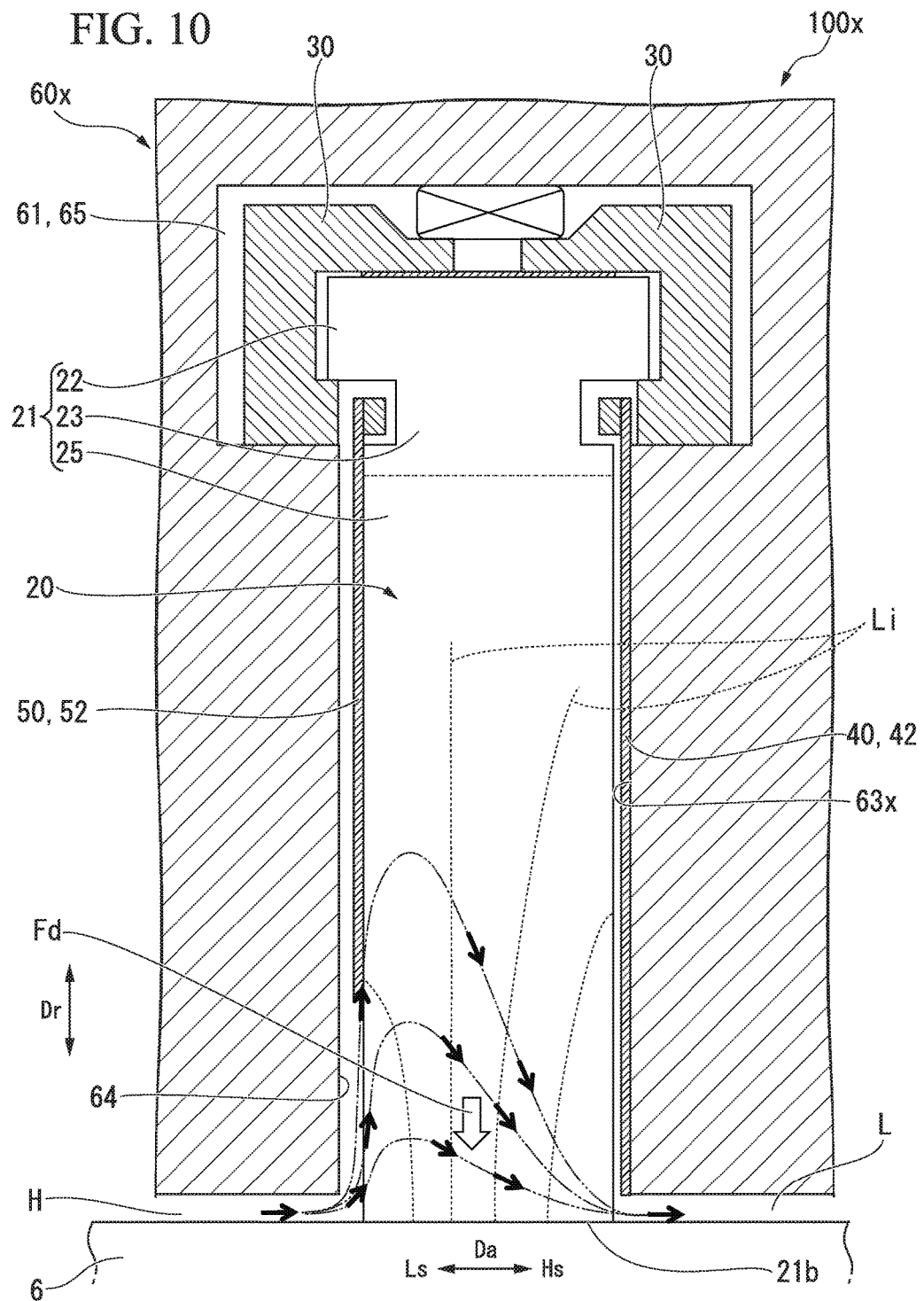
FIG. 10 is a sectional view of a shaft sealing device in a comparative example in a non-normal operation.

For deep understanding of the operation of the shaft sealing device 100 in the embodiment, the non-normal operation of a shaft sealing device 100x in a comparative example will be described with reference to FIG. 10.

The shaft sealing device 100x in the comparative example has the same configuration as that of the shaft sealing device 100 in the embodiment except for the point that the inflow groove 66 and the communication groove 68 in the first embodiment are not formed in a high pressure-side inner surface 63x of a housing 60x. Accordingly, unlike the shaft sealing device 100 in the embodiment, the inflow groove 66 and the communication path 69 are not formed in the shaft sealing device 100x in the comparative example.

During the non-normal operation, since pressure in the low pressure region Ls is a high pressure H, the sealing body 20, which is a bundle of the thin plate-like sealing pieces 21, and the holding rings 30 holding the head portions 22 of the thin plate-like sealing pieces 21 are integrally shifted to the annular recessed portion 61 of the housing 60x in the high pressure region Hs.

The low pressure-side sealing plate 50 is separated from the low pressure-side inner surface 64 of the housing 60x. In contrast, the low pressure-side sealing plate 50 is in contact with the edge of the sealing body 20 in the low pressure region Ls. The high pressure-side sealing plate 40 is separated from the edge of the sealing body 20 in the high pressure region Hs. In contrast, the high pressure-side sealing plate 40 is in contact with the high pressure-side inner surface 63x of the housing 60x. For this reason, the working fluid having a high pressure H in the low pressure region Ls flows into the gaps between the thin plate-like sealing pieces 21 through a radially inner portion (not in contact with the low pressure-side sealing plate 50) of the edges of the thin plate-like sealing pieces 21 in the low pressure region Ls.

As described above, the gap between the rotating shaft 6 and the radially inner edge of the low pressure-side sealing plate 50 is greater than the gap between the rotating shaft 6 and the radially inner edge of the high pressure-side sealing plate 40. For this reason, between the thin plate-like sealing pieces 21, a portion having the highest pressure during a non-normal operation, that is, the radially inner portion (not in contact with the low pressure-side sealing plate 50) of the edges of the thin plate-like sealing pieces 21 in the low pressure region Ls extends to the outside in the radial direction further than the portion having the highest pressure during a normal operation.

Accordingly, between the thin plate-like sealing pieces 21, the pressure in the radially inner portion of the edges of the trunk portions 25 of the sealing plate in the low pressure region Ls is the highest pressure, is gradually decreased toward the high pressure region Hs in the axial direction Da, and is gradually decreased toward the radially inside of the high pressure-side sealing plate 40. The dotted lines depicted inside of the trunk portion 25 of the thin plate-like sealing piece 21 in FIG. 10 represent constant pressure lines Li.

Since the working fluid, which flows into the gaps between the thin plate-like sealing pieces 21 through the radially inner portion (not in contact with the low pressure-side sealing plate 50) of the edges of the thin plate-like sealing pieces 21 in the low pressure region Ls, has the aforementioned pressure distribution, the working fluid flows to the inside in the radial direction while flowing to the high pressure region Hs having a low pressure L in the axial direction Da. As described above, pressure at the entire radial edges of the trunk portions 25 of the thin plate-like sealing pieces 21 in the high pressure region Hs is substantially the same as pressure in the high pressure region Hs. For this reason, the working fluid, which passes between the thin plate-like sealing pieces 21, flows to the edges of the thin plate-like sealing pieces 21 in the high pressure region Hs, and flows between the edges of the thin plate-like sealing pieces 21 in the high pressure region Hs and the high pressure-side sealing plate 40 to the inside in the radial direction. The working fluid flows into a region having a low pressure L through a gap between the high pressure-side sealing plate 40 and the rotating shaft 6. As such, as illustrated by the arrows in FIG. 10, the flow of the working fluid to the inside in the radial direction is formed between the thin plate-like sealing pieces 21.

As described above, in the shaft sealing device 100x of the comparative example, during a non-normal operation, the free end, which is the radially inner end 21b of each of the thin plate-like sealing pieces 21, may not be lifted from the rotating shaft 6 due to the application of a settling force Fd caused by the flow (non-normal operation flow) of the fluid between the thin plate-like sealing pieces 21.

Figure 8:
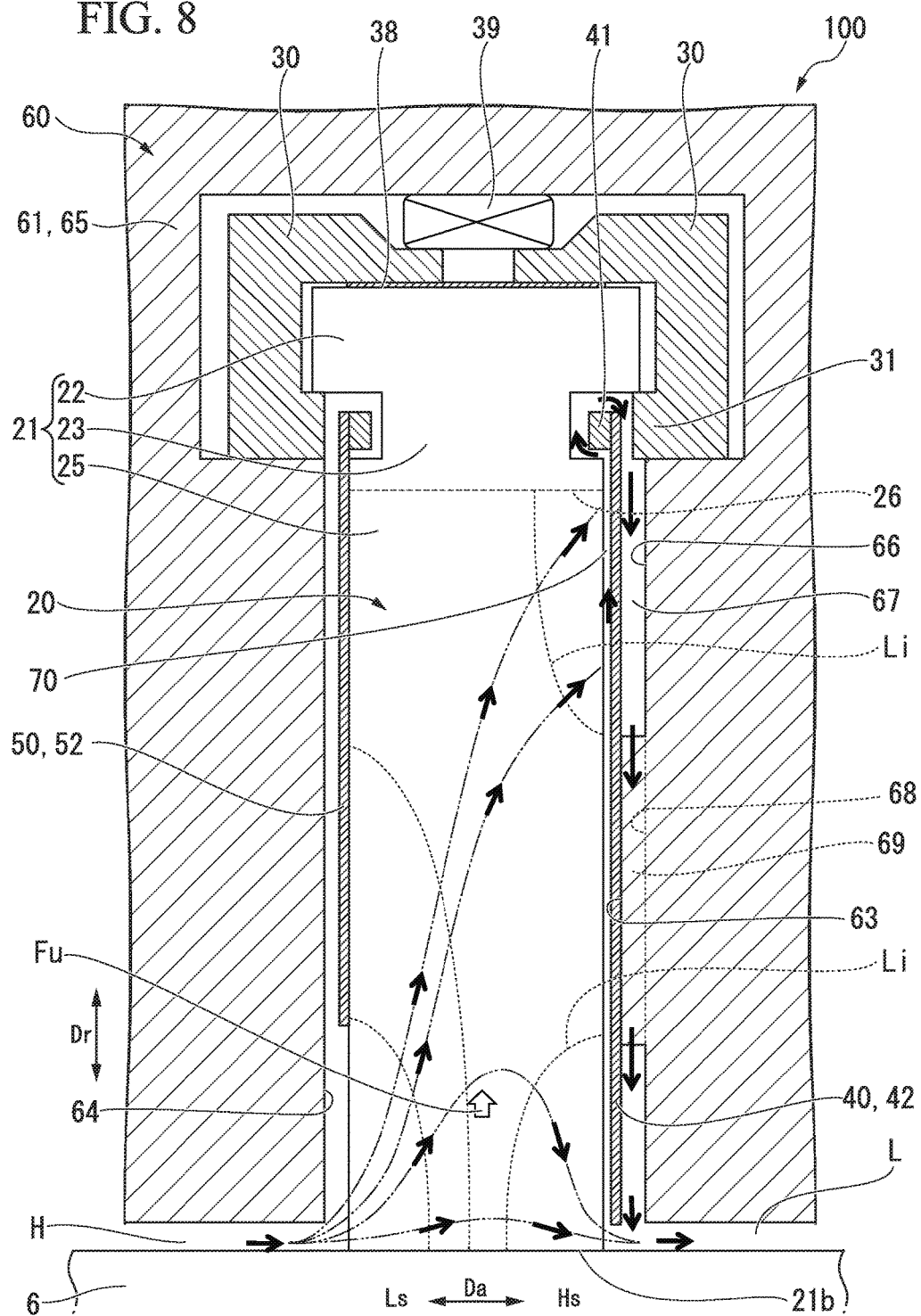
FIG. 8 is a sectional view of the shaft sealing device in the first embodiment of the present invention during a non-normal operation.
Figure 9:
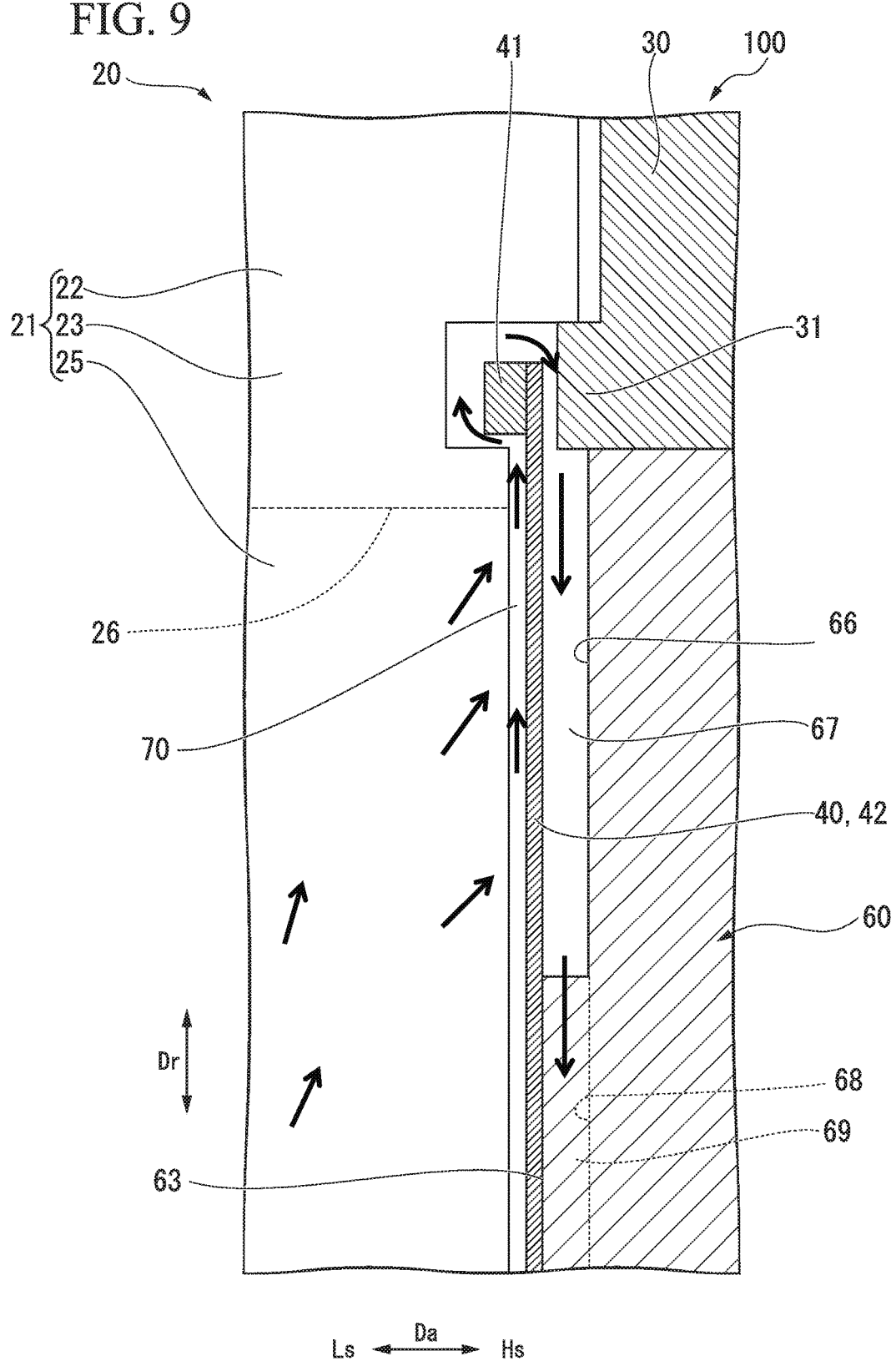
FIG. 9 is an enlarged sectional view illustrating a main portion of the shaft sealing device in the first embodiment of the present invention during a non-normal operation.

Hereinafter, the non-normal operation of the shaft sealing device 100 in the embodiment will be described with reference to FIGS. 8 and 9.

Similar to the comparative example, in the embodiment, during a non-normal operation, pressure in the low pressure region Ls is a high pressure H, and thus, the sealing body 20, which is a bundle of the thin plate-like sealing pieces 21, and the holding rings 30 holding the head portions 22 of the thin plate-like sealing pieces 21 are integrally shifted to the annular recessed portion 61 of the housing 60 in the high pressure region Hs.

Also, in the embodiment, the low pressure-side sealing plate 50 is separated from the low pressure-side inner surface 64 of the housing 60. In contrast, the low pressure-side sealing plate 50 is in contact with the edge of the sealing body 20 in the low pressure region Ls. For this reason, the working fluid flows into the gaps between the thin plate-like sealing pieces 21 through the radially inner portion (not in contact with the low pressure-side sealing plate 50) of the edges of the thin plate-like sealing pieces 21 in the low pressure region Ls.

The high pressure-side sealing plate 40 is separated from the edge of the sealing body 20 in the high pressure region Hs. In contrast, the high pressure-side sealing plate 40 is in contact with a high pressure-side inner surface 63 of the housing 60. For this reason, pressure at the entire radial edges of the trunk portions 25 of the thin plate-like sealing pieces 21 in the high pressure region Hs is substantially the same as pressure in the high pressure region Hs having a low pressure L.

In the shaft sealing device 100 of the embodiment, the inflow groove 66 is formed at an outside position in the radial direction between the high pressure-side sealing plate 40 and the housing 60. During a non-normal operation, since the high pressure-side sealing plate 40 is separated from the edge of the sealing body 20 in the high pressure region Hs, the gaps between the thin plate-like sealing pieces 21 communicate with the inflow groove 66. Specifically, the gaps between the thin plate-like sealing pieces 21 communicate with the inflow groove 66 via a gap between the thin plate-like side sealing portion 42 of the high pressure-side sealing plate 40 and the edges of the trunk portions 25 of the thin plate-like sealing pieces 21 (forming the sealing body 20) in the high pressure region Hs; a gap between the head portions 23 of the thin plate-like sealing pieces 21 and the base portion 41 of the high pressure-side sealing plate 40; and a gap between the side plate 31 of the holding ring 30 on the outside in the radial direction in the high pressure region Hs and the base portion 41 of the high pressure-side sealing plate 40.

The inflow groove 66 communicates with a space in the high pressure region Hs having a low pressure L via the communication paths 69. Accordingly, in the embodiment, during a non-normal operation, a non-normal operation flow path 70 is formed from the gaps between the thin plate-like sealing pieces 21 to the space in the high pressure region Hs having a low pressure L via the inflow groove 66 and the communication paths 69.

For this reason, the working fluid, which flows into the gaps between a large number of the thin plate-like sealing pieces 21 through the radially inner portion (not in contact with the low pressure-side sealing plate 50) of the edges of a large number of the thin plate-like sealing pieces 21 in the low pressure region Ls, flows to the space in the high pressure region Hs having a low pressure L from the gaps between the thin plate-like sealing pieces 21 through the non-normal operation flow path 70 and a gap between a radially inner end portion of the housing 60 in the high pressure region Hs and the rotating shaft 6. A portion of the working fluid flowing into the gaps between the thin plate-like sealing pieces 21 flows between the thin plate-like sealing pieces 21 to the space in the high pressure region Hs having a low pressure L through the gap between the high pressure-side sealing plate 40 and the rotating shaft 6. For this reason, as illustrated by the arrows in FIG. 8, the flow of the working fluid to the outside in the radial direction is formed between the thin plate-like sealing pieces 21. The dotted lines depicted inside of the trunk portion 25 of the thin plate-like sealing piece 21 in FIG. 8 represent constant pressure lines Li.

In the shaft sealing device 100 of the embodiment, during a non-normal operation, a small settling force also occurs at the radially inner ends 21b of the thin plate-like sealing pieces 21 due to a portion (flowing through the radially inner portion of the edges of the trunk portions 25 of the thin plate-like sealing pieces 21 in the high pressure region Hs) of the flow of the working fluid between the thin plate-like sealing pieces 21. In contrast, in the shaft sealing device 100 of the embodiment, during a non-normal operation, the lifting force Fu occurs at the radially inner ends 21b of the thin plate-like sealing pieces 21 due to the flow of the working fluid through the non-normal operation flow path 70.

Accordingly, in the shaft sealing device 100 of the embodiment, also, during a non-normal operation, the free end, which is the radially inner end 21b of each of the thin plate-like sealing pieces 21, can be lifted from the rotating shaft 6 due to the occurrence of the lifting force Fu caused by the flow (non-normal operation flow) of the working fluid between the thin plate-like sealing pieces 21.

Figure 7:
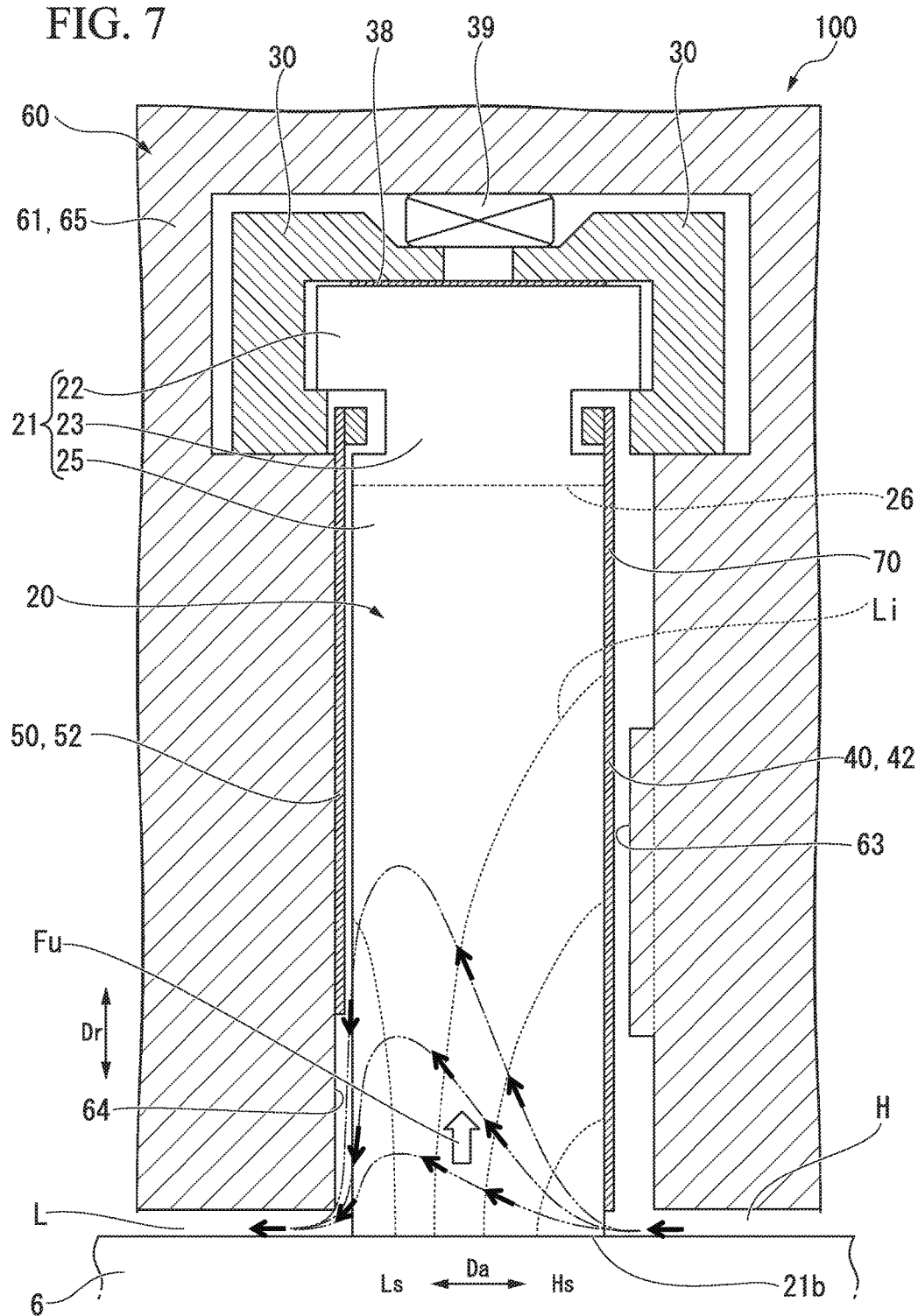
FIG. 7 is a sectional view of the shaft sealing device in the first embodiment of the present invention during a normal operation.

In the shaft sealing device 100 of the embodiment, as illustrated in FIG. 7, during a normal operation, the high pressure-side sealing plate 40 is in contact with the edge of the sealing body 20 in the high pressure region Hs, and a portion of the non-normal operation flow path 70, which is positioned in a radially outer portion of the edges of the trunk portions 25 of the thin plate-like sealing pieces 21 in the high pressure region Hs, is blocked. For this reason, the flow of the working fluid to cause the occurrence of a settling force on the thin plate-like sealing pieces 21 is not formed. As such, in the embodiment, during a normal operation, a portion of the non-normal operation flow path 70 is blocked by the high pressure-side sealing plate 40, and the occurrence of a settling force at the radially inner ends 21b of the thin plate-like sealing pieces 21 is minimized.

As described above, in the embodiment, since the free end, which is the radially inner end 21b of each of the thin plate-like sealing pieces 21, is lifted from the rotating shaft 6 during not only a normal operation but also a non-normal operation, it is possible to prevent wear on the thin plate-like sealing pieces 21, and to extend seal life.

[Second Embodiment of Shaft Sealing Device]

Figure 11:
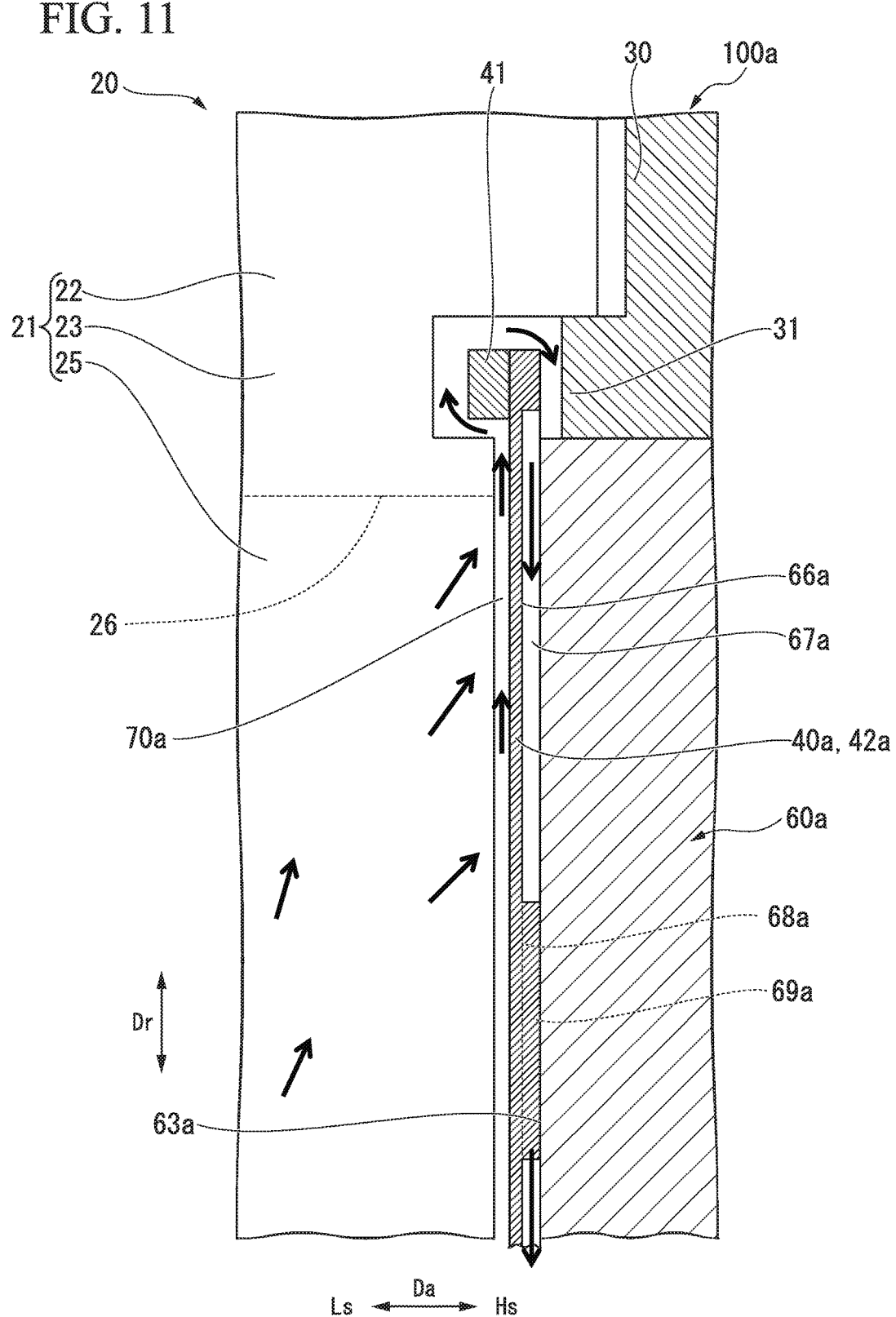
FIG. 11 is an enlarged sectional view illustrating a main portion of a shaft sealing device in a second embodiment of the present invention during a non-normal operation.

Hereinafter, a shaft sealing device in a second embodiment of the present invention will be described with reference to FIG. 11.

In the shaft sealing device 100 of the first embodiment, the inflow groove 66 and the multiple communication grooves 68 are formed in the high pressure-side inner surface 63 of the housing 60. In contrast, in a shaft sealing device 100a of the embodiment, an inflow groove 66a and multiple communication grooves 68a are formed in a high pressure-side sealing plate 40a.

The inflow groove 66a in the embodiment is formed in a surface (facing a high pressure-side inner surface 63a of a housing 60a) of a thin plate-like side sealing portion 42a of the high pressure-side sealing plate 40a. The inflow groove 66a is formed on the radially outside of the thin plate-like side sealing portion 42a to extend in the circumferential direction Dc. An inflow space 67a is formed inside of the inflow groove 66a between the housing 60a and the high pressure-side sealing plate 40a.

The multiple communication grooves 68a in the embodiment are formed of recesses of a portion of the thin plate-like side sealing portion 42a with respect to the high pressure-side inner surface 63a of the housing 60a, and extend to the inside from the inflow groove 66a in the radial direction. The multiple communication grooves 68a are formed while being spaced therebetween in the circumferential direction Dc. Communication paths 69a are formed inside of the multiple communication grooves 68a between the housing 60a and the high pressure-side sealing plate 40a.

Also, in the embodiment, during a non-normal operation, the gaps between a large number of the thin plate-like sealing pieces 21 communicate with the inflow groove 66a via a gap between the thin plate-like side sealing portion 42a of the high pressure-side sealing plate 40a and the edges of the trunk portions 25 of the thin plate-like sealing pieces 21 in the high pressure region Hs; a gap between the head portions 23 of the thin plate-like sealing pieces 21 and the base portion 41 of the high pressure-side sealing plate 40a; and a gap between the side plate 31 of the holding ring 30 on the inside in the radial direction in the high pressure region Hs and the base portion 41 of the high pressure-side sealing plate 40a. The inflow groove 66a communicates with a space in the high pressure region Hs having a low pressure L via the communication paths 69a. Accordingly, also, in the embodiment, during a non-normal operation, a non-normal operation flow path 70a is formed from the gaps between the thin plate-like sealing pieces 21 to the space in the high pressure region Hs having a low pressure L via the inflow groove 66a and the communication paths 69a. For this reason, similar to the first embodiment, also, during a non-normal operation, the free end, which is the radially inner end 21b of each of the thin plate-like sealing pieces 21 can be lifted from the rotating shaft 6.

During a normal operation, the high pressure-side sealing plate 40a is in contact with the edge of the sealing body 20 in the high pressure region Hs, and a portion of the non-normal operation flow path 70a, which is positioned in a radially outer portion of the edges of the trunk portions 25 of the thin plate-like sealing pieces 21 in the high pressure region Hs, is blocked. For this reason, similar to the first embodiment, during a normal operation, the free end, which is the radially inner end 21b of each of the thin plate-like sealing pieces 21, is lifted from the rotating shaft 6.

Accordingly, also, in the embodiment, similar to the first embodiment, it is possible to prevent wear on the thin plate-like sealing pieces 21, and to extend seal life.

[Third Embodiment of Shaft Sealing Device]

Figure 12:
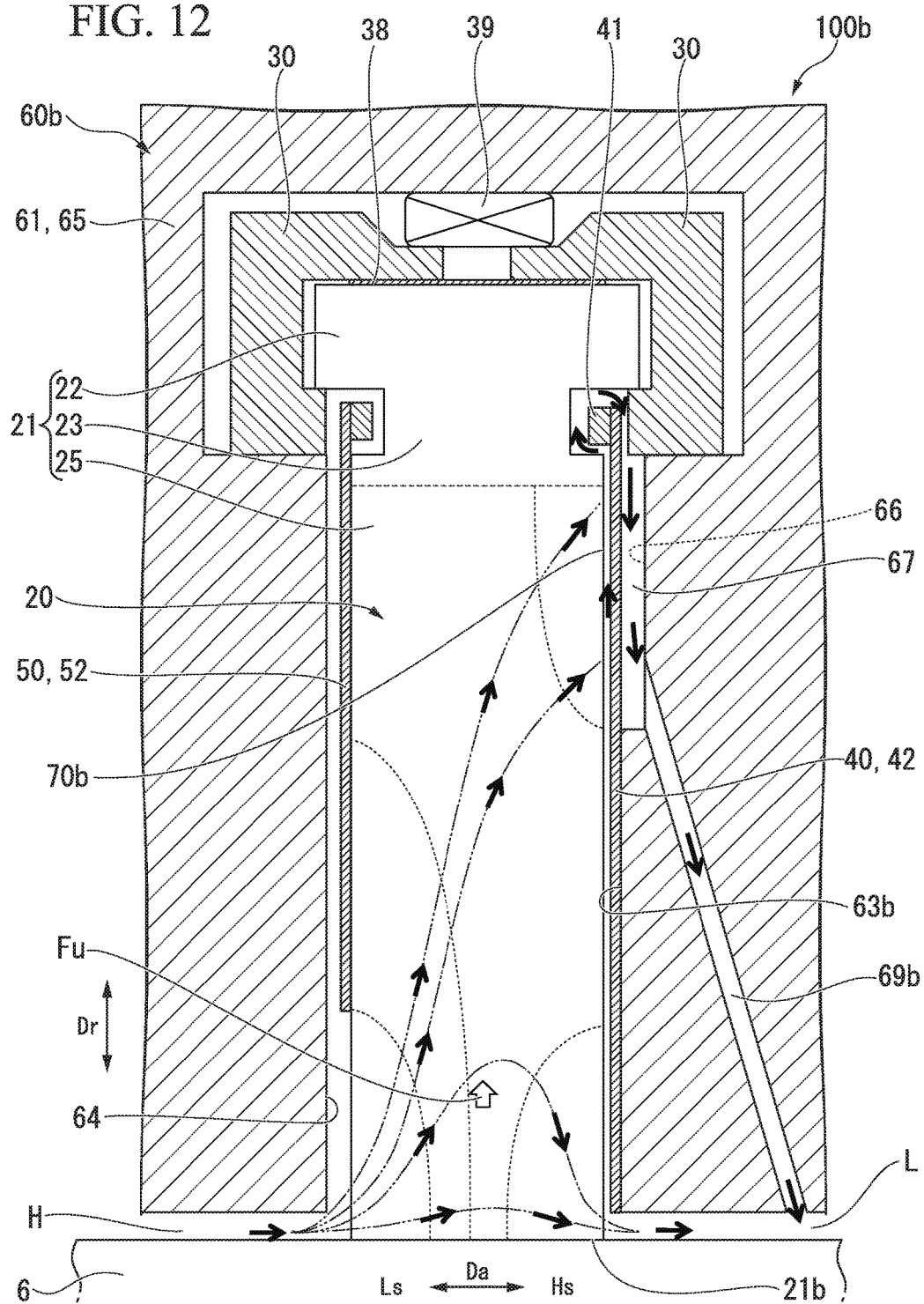
FIG. 12 is a sectional view of a shaft sealing device in a third embodiment of the present invention during a non-normal operation.

Hereinafter, a shaft sealing device in a third embodiment of the present invention will be described with reference to FIG. 12.

A shaft sealing device 100*b* in the embodiment is a modification example of the shaft sealing device 100 in the first embodiment. In the shaft sealing device 100 of the first embodiment, the inflow groove 66 and the multiple communication grooves 68 are formed in the high pressure-side inner surface 63 of the housing 60. The inflow space 67 is formed inside of the inflow groove 66 between the high pressure-side sealing plate 40 and the housing 60, and the communication paths 69 are formed inside of the multiple communication grooves 68.

Also, in the embodiment, similar to the first embodiment, the inflow groove 66 is formed in a high pressure-side inner surface 63*b* of a housing 60*b*. The inflow space 67 is formed inside of the inflow groove 66 between the high pressure-side sealing plate 40 and the housing 60*b*. In contrast, a communication path 69*b* in the embodiment passes through the housing 60*b* from the inflow space 67, and communicates with a space in the high pressure region Hs. Multiple communication paths 69*b* are formed in the housing 60*b* while being spaced therebetween the circumferential direction Dc. Accordingly, also, in the embodiment, during a non-normal operation, a non-normal operation flow path 70*b* is formed from the gaps between the thin plate-like sealing pieces 21 to the space in the high pressure region Hs having a low pressure L via the inflow groove 66 and the communication paths 69*b*.

Insofar as the inflow groove and the space in the high pressure region Hs are capable of communicating with each other via the communication path, unlike the first and second embodiments, the communication path may not be formed between the high pressure-side sealing plate and the housing.

The embodiment is a modification example of the first embodiment. Similar to the embodiment, also, in the second embodiment, the communication path may be formed which passes through the housing 60*a* from the inflow groove 66*a*, and which communicates with the space in the high pressure region Hs having a low pressure L during a non-normal operation.

[Fourth Embodiment of Shaft Sealing Device]

Figure 13:
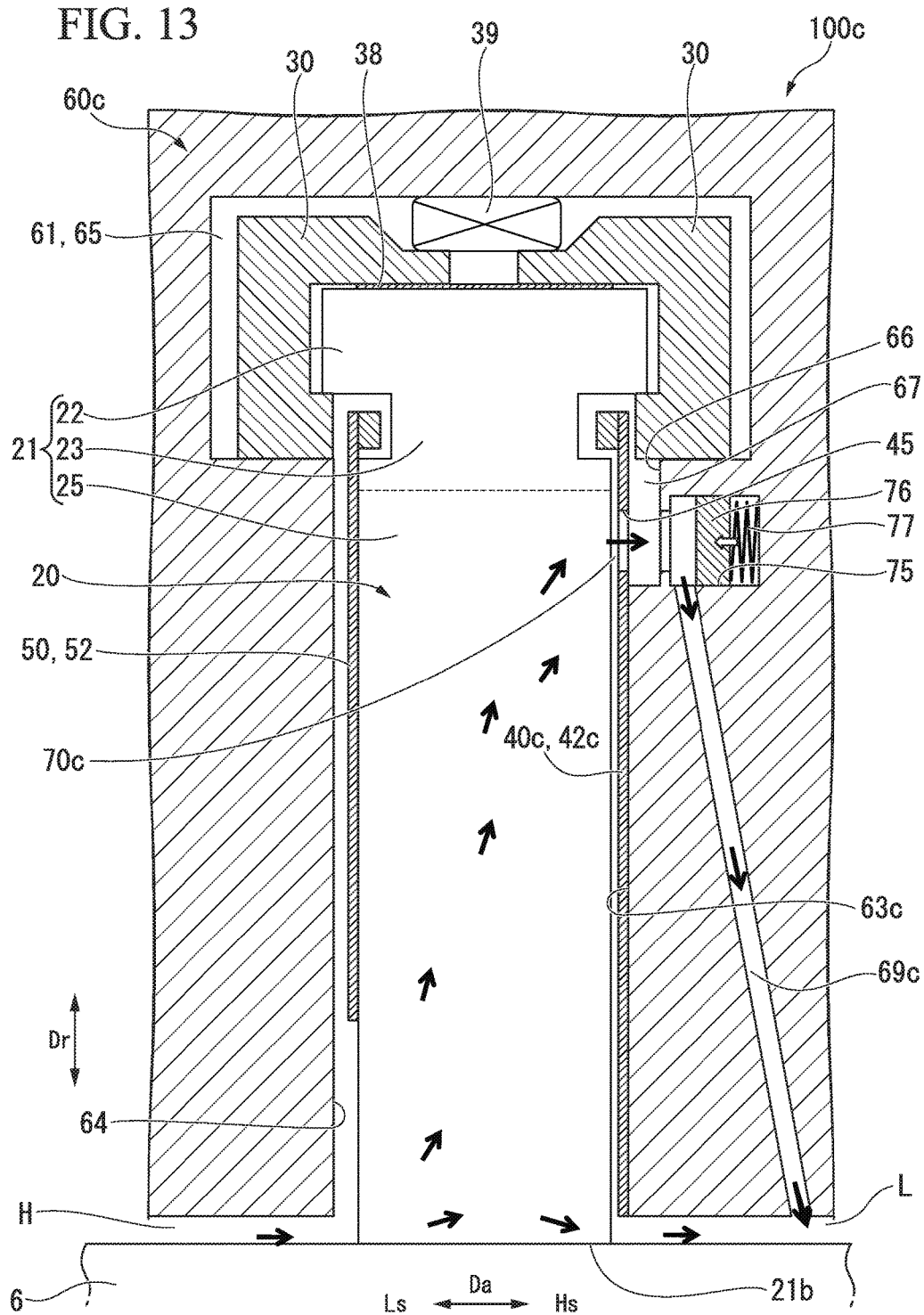
FIG. 13 is a sectional view of a shaft sealing device in a fourth embodiment of the present invention during a non-normal operation.

Hereinafter, a shaft sealing device in a fourth embodiment of the present invention will be described with reference to FIG. 13.

In the shaft sealing devices 100, 100*a*, and 100*b* of the aforementioned embodiments, the high pressure-side sealing plates 40 and 40*a* are used as blocking member blocking a portion of the non-normal operation flow paths 70, 70*a*, and 70*b* during a normal operation. In a shaft sealing device 100*c* of the embodiment, a high pressure-side sealing plate 40*c* is not used as a blocking member, and a blocking member 76 is separately provided.

In the embodiment, a through hole 45 is formed in a thin plate-like side sealing portion 42*c* of the high pressure-side sealing plate 40*c* on the outside in the radial direction such that the through hole 45 passes through the thin plate-like side sealing portion 42*c* in the axial direction Da. The inflow groove 66 is formed in a high pressure-side inner surface 63*c* of a housing 60*c* such that the inflow groove 66 is positioned to face the through hole 45 in the axial direction Da, and extends in the circumferential direction Dc. Also, in the embodiment, the inflow space 67 is formed inside of the inflow groove 66 between the high pressure-side sealing plate 40*c* and the housing 60*c*. Multiple communication paths 69*c* are formed in the housing 60*c* which pass through the housing 60*c* from the inflow space 67, and which communicate with a space in the high pressure region Hs having a low pressure L during a non-normal operation.

In addition, a blocking member accommodating portion 75 is formed in the housing 60*c* to be positioned on each of the communication paths 69*c* and to have a diameter greater than the inner diameter of the communication path 69*c*. The blocking member 76 and an elastic body 77 such as a spring are disposed inside of each of the blocking member accommodating portions 75. The blocking member 76 can be moved inside the blocking member accommodating portion 75 between a blocking position at which the communication path 69*c* is blocked and an open position at which the communication path 69*c* is open. The elastic body 77 biases the blocking member 76 from the open position toward the blocking position.

In the embodiment, a non-normal operation flow path 70*c* is formed of the gaps between a large number of the thin plate-like sealing pieces 21, the through hole 45 of the high pressure-side sealing plate 40*c*, the inflow space 67 formed in the housing 60*c*, the communication paths 69*c*, and the blocking member accommodating portions 75.

During a non-normal operation, a portion of the fluid flowing into the gaps between a large number of the thin plate-like sealing pieces 21 from the low pressure region Ls flows into the inflow space 67 through the through hole 45 of the high pressure-side sealing plate 40*c*. The pressure of the fluid flowing into the inflow space 67 is increased by a biasing force which biases the blocking member 76 from the open position toward the blocking position. For this reason, during a non-normal operation, the blocking member 76 is positioned at the open position inside the blocking member accommodating portion 75, and the communication path 69*c* is open. Accordingly, the fluid flowing into the inflow space 67 passes through the communication paths 69*c* and flows into the space in the high pressure region Hs having a low pressure L.

In contrast, during a normal operation, since pressure is not applied from the inflow space 67 to the blocking member 76, the blocking member 76 is positioned at the blocking position inside the blocking member accommodating portion 75 due to the biasing force of the elastic body 77, and a portion of the communication path 69*c* is blocked.

As described above, also, in the embodiment, during a non-normal operation, a portion of the working fluid flows into the space in the high pressure region Hs having a low pressure L from the low pressure region Ls having a high pressure H through the non-normal operation flow path 70*c*, and thus, the free end, which is the radially inner end 21*b* of each of the thin plate-like sealing pieces 21, can be lifted from the rotating shaft 6. During a normal operation, since a portion of the non-normal operation flow path 70*c* is blocked, the free end, which is the radially inner end 21*b* of each of the thin plate-like sealing pieces 21, is lifted from the rotating shaft 6.

[Fifth Embodiment of Shaft Sealing Device]

Figure 14:
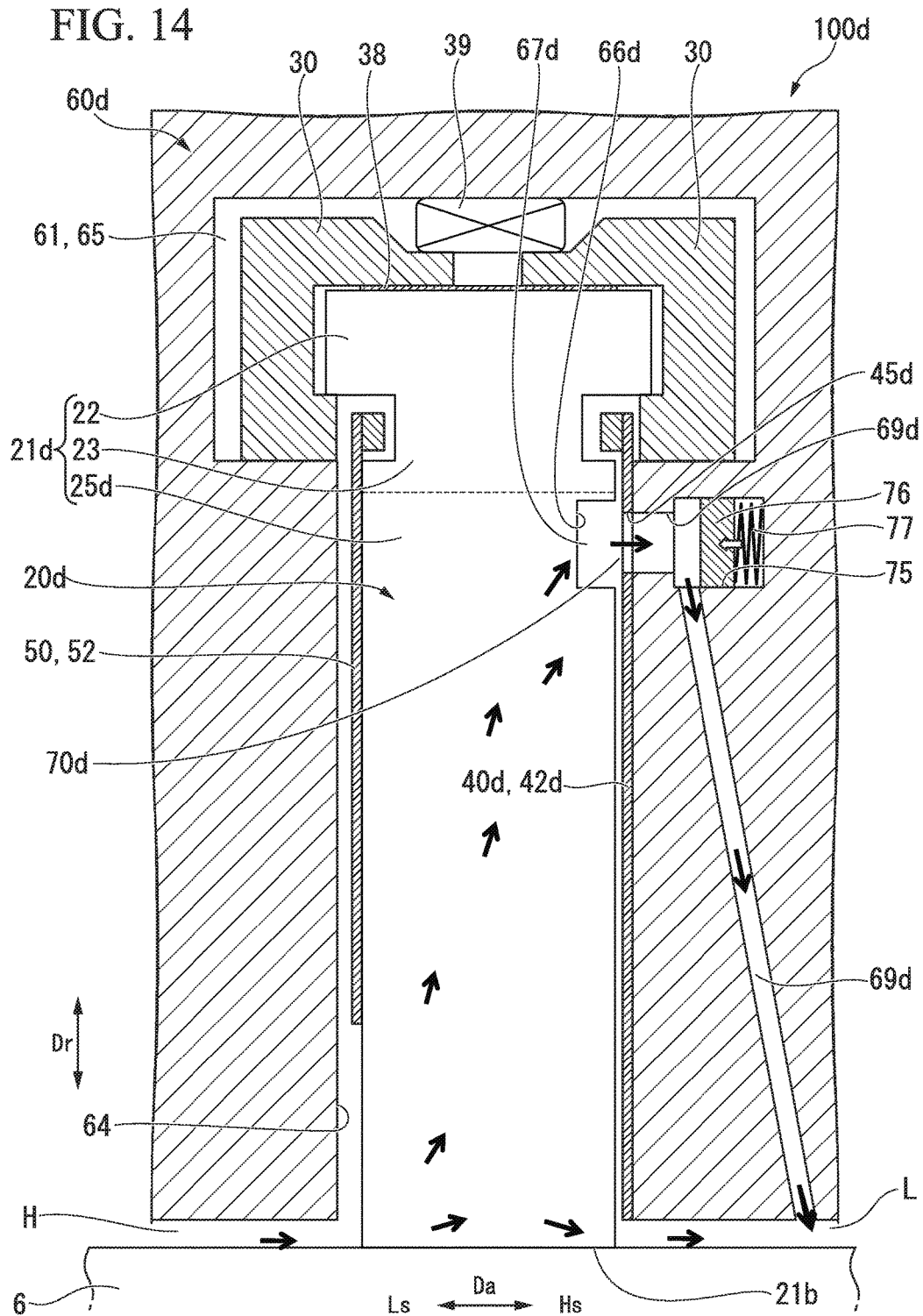
FIG. 14 is a sectional view of a shaft sealing device in a fifth embodiment of the present invention during a non-normal operation.

Hereinafter, a shaft sealing device in a fifth embodiment of the present invention will be described with reference to FIG. 14.

A shaft sealing device 100*d* in the embodiment is a modification example of the shaft sealing device 100*c* in the fourth embodiment. In the shaft sealing device 100*c* of the fourth embodiment, the inflow groove 66 is formed in the high pressure-side inner surface 63c of the housing 60c, and the inflow space 67 is formed inside of the inflow groove 66 between the high pressure-side sealing plate 40c and the housing 60c.

In the embodiment, a recess is formed at a radially outer portion of edges of trunk portions 25d of thin plate-like sealing pieces 21d in the high pressure region Hs, and is recessed to the low pressure region Ls. For this reason, an inflow groove 66d is formed in a radially outer portion of an edge of a sealing body 20d (which is a bundle of the thin plate-like sealing pieces 21d) in the high pressure region Hs such that the inflow groove 66d is recessed to the low pressure region Ls and extends in the circumferential direction Dc. An inflow space 67d is formed inside of the inflow groove 66d between the sealing body 20d and a high pressure-side sealing plate 40d.

A through hole 45d is formed in a thin plate-like side sealing portion 42d of the high pressure-side sealing plate 40d such that the through hole 45d is positioned to face the inflow groove 66d and passes through the thin plate-like side sealing portion 42d in the axial direction Da. Multiple communication paths 69d are formed in a housing 60d which pass through the housing 60d from a position facing the through hole 45d of the high pressure-side sealing plate 40d, and which communicate with a space in the high pressure region Hs having a low pressure L during a non-normal operation. Also, in the embodiment, similar to the fourth embodiment, the blocking member accommodating portion 75 is formed in the housing 60d such that the blocking member accommodating portion 75 is positioned on each of the communication paths 69d and has a diameter greater than the inner diameter of the communication path 69d. The blocking member 76 and an elastic body 77 such as a spring are disposed inside of each of the blocking member accommodating portions 75.

In the embodiment, a non-normal operation flow path 70d is formed of the gaps between a large number of the thin plate-like sealing pieces 21d, the inflow space 67d formed in the sealing body 20d, the through hole 45d of the high pressure-side sealing plate 40d, and the communication paths 69d and the blocking member accommodating portions 75 formed in the housing 60d.

As described above, the inflow space 67d can be formed not only between the housing and the high pressure-side sealing plate but also between the high pressure-side sealing plate 40d and the sealing body 20d.

In the aforementioned case, the shaft sealing device is applied to a gas turbine; however, the present invention is not limited to the case in which the shaft sealing device is applied to a gas turbine, and can be applied to various rotating machines such as a steam turbine, a compressor, a hydraulic turbine, a refrigerator, and a pump.

INDUSTRIAL APPLICABILITY

According to an aspect of the present invention, during a non-normal operation in which pressure in a low pressure region is higher than pressure in a high pressure region, it is possible to decrease contact pressure between a free end of each of thin plate-like sealing pieces and a rotating shaft, and to extend seal life.

REFERENCE SIGNS LIST

2: COMPRESSOR
2a: COMPRESSOR ROTOR
2b: COMPRESSOR CASING
3: COMBUSTION CHAMBER
4: TURBINE
4a: TURBINE ROTOR
4b: TURBINE CASING
6, 6b, 6d: ROTATING SHAFT
8: STATOR
9: MOUNTING PORTION
10a, 10b, 10c, 10d, 100, 100a, 100b, 100c, 100d: SHAFT SEALING DEVICE
20, 20d: SEALING BODY
21, 21d: THIN PLATE-LIKE SEALING PIECE
21b: RADIALLY INNER END PORTION
22: HEAD PORTION
23: NECK PORTION
25, 25d: TRUNK PORTION
30: HOLDING RING
40, 40a, 40c, 40d: HIGH PRESSURE-SIDE SEALING PLATE
50: LOW PRESSURE-SIDE SEALING PLATE
60, 60a, 60b, 60c, 60d: HOUSING
61: ANNULAR RECESSED PORTION
63, 63a, 63b, 63c: HIGH PRESSURE-SIDE INNER SURFACE
64: LOW PRESSURE-SIDE INNER SURFACE
66, 66a, 66d: INFLOW GROOVE
67, 67a, 67d: INFLOW SPACE
68, 68a: COMMUNICATION GROOVE
69, 69a, 69b, 69c, 69d: COMMUNICATION PATH
70, 70a, 70b, 70c, 70d: NON-NORMAL OPERATION FLOW PATH
75: BLOCKING MEMBER ACCOMMODATING PORTION
76: BLOCKING MEMBER
77: ELASTIC BODY

The invention claimed is:

1. A shaft sealing device that divides an annular space between a rotating shaft and a stator covering an outer circumferential side of the rotating shaft into a low pressure region and a high pressure region in an axial direction in which the rotating shaft extends, the device comprising:
   a housing in which an annular recessed portion is formed to extend in a circumferential direction with respect to the rotating shaft as a center, and which is fixed to the stator;
   a sealing body which is disposed at an outer circumference of the rotating shaft, and a portion of which is accommodated by the annular recessed portion of the housing and is positioned on the radially outside of the rotating shaft; and
   a high pressure-side sealing plate that is disposed along the sealing body in the high pressure region inside the annular recessed portion of the housing while a thickness direction of the high pressure-side sealing plate is aligned with the axial direction,
   wherein an inflow groove is formed in a radially outer portion of any member of the sealing body, the housing, and the high pressure-side sealing plate such that a fluid is capable of flowing through a portion of the sealing body from the low pressure region, and
   wherein a communication path is formed in either member of the housing and the high pressure-side sealing plate such that the inflow groove and a space in the high pressure region communicate with each other via the communication path.

2. The shaft sealing device according to claim 1, further comprising:

a blocking member which is displaced due to a change in the pressure in the high pressure region relative to the pressure in the low pressure region such that the blocking member opens a non-normal operation flow path formed from the sealing body to the space in the high pressure region via the inflow groove and the communication path, during a non-normal operation in which pressure in the low pressure region is higher than pressure in the high pressure region, and the blocking member blocks a portion of the non-normal operation flow path during a normal operation in which the pressure in the high pressure region is higher than the pressure in the low pressure region.

3. The shaft sealing device according to claim 2,
wherein the high pressure-side sealing plate is disposed in the annular recessed portion such that the high pressure-side sealing plate can be moved relative to the housing and the sealing body in the axial direction, and
wherein the blocking member is the high pressure-side sealing plate that comes into contact with the sealing body and blocks a portion of the non-normal operation flow path during the normal operation, and does not come into contact with the sealing body and opens the non-normal operation flow path during the non-normal operation.

4. The shaft sealing device according to claim 3,
wherein multiple communication paths are formed in the housing which pass through the inside of the housing from the inflow groove, and which communicate with the space in the high pressure region.

5. The shaft sealing device according to claim 2,
wherein multiple communication paths are formed in the housing which pass through the inside of the housing from the inflow groove, and which communicate with the space in the high pressure region, and a blocking member accommodating portion is formed in the housing such that the blocking member accommodating portion communicates with the communication paths, and accommodates the blocking member such that the blocking member accommodating portion can be moved between a blocking position at which the communication path is blocked during the normal operation and an open position at which the communication path is open during the non-normal operation.

6. The shaft sealing device according to claim 2,
wherein multiple communication paths are formed in the housing which pass through the inside of the housing from the inflow groove, and which communicate with the space in the high pressure region.

7. The shaft sealing device according to claim 1,
wherein multiple communication paths are formed in the housing which pass through the inside of the housing from the inflow groove, and which communicate with the space in the high pressure region.

8. A rotating machine comprising:
the shaft sealing device according to claim 1;
the rotating shaft; and
the stator.

* * * * *